US012437709B2

(12) United States Patent
Kim et al.

(10) Patent No.: US 12,437,709 B2
(45) Date of Patent: Oct. 7, 2025

(54) DISPLAY DEVICE AND DRIVING METHOD

(71) Applicant: LG Display Co., Ltd, Seoul (KR)

(72) Inventors: SunYoon Kim, Gyeonggi-do (KR); Jin-Hyun Jung, Gyeonggi-do (KR); Byungjae Lee, Gyeonggi-do (KR)

(73) Assignee: LG Display Co., Ltd (KR)

( * ) Notice: Subject to any disclaimer, the term of this patent is extended or adjusted under 35 U.S.C. 154(b) by 0 days.

(21) Appl. No.: 18/534,870

(22) Filed: Dec. 11, 2023

(65) Prior Publication Data

US 2024/0221625 A1 Jul. 4, 2024

(30) Foreign Application Priority Data

Dec. 30, 2022 (KR) ........................ 10-2022-0190504

(51) Int. Cl.
*G09G 3/32* (2016.01)

(52) U.S. Cl.
CPC ....... *G09G 3/32* (2013.01); *G09G 2300/0842* (2013.01); *G09G 2310/0275* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 2016/0163265 A1* | 6/2016 | Yang | .................... | G09G 3/3233 345/76 |
| 2020/0020277 A1* | 1/2020 | Lee | ........................ | H10K 50/81 |

* cited by examiner

*Primary Examiner* — Brian M Butcher
(74) *Attorney, Agent, or Firm* — Fish & Richardson P.C.

(57) ABSTRACT

A display device includes a driving transistor used for driving a light emitting element; a scanning transistor electrically connected between a first node that is a gate node of the driving transistor and a data line to which a data voltage is supplied; a storage capacitor electrically connected between a second node of the driving transistor and the first node; and a charging ratio sensing unit electrically connected to the data line through an input line, wherein the charging ratio sensing unit senses a voltage charged in the storage capacitor through the input line. Accordingly, it may efficiently improve a pixel charging ratio by a charging ratio sensing unit connected to a data line through an input line sensing a voltage charged in a storage capacitor through the input line.

19 Claims, 15 Drawing Sheets

DISPLAY DEVICE AND DRIVING METHOD

CROSS-REFERENCE TO RELATED APPLICATION

This application claims the priority of Korean Patent Application No. 10-2022-0190504, filed on Dec. 30, 2022, which is hereby incorporated by reference in its entirety.

BACKGROUND

Field of the Disclosure

The present disclosure relates to a display device and a driving method.

Description of the Background

In accordance with development of the information society, requests for display devices used for displaying videos have increased in various forms, and, recently, various display devices such as a liquid crystal display device and an organic light emitting display device are used.

For video display, a display device may include a display panel in which multiple data lines, multiple gate lines, and multiple subpixels are disposed, a data driving circuit outputting data signals to multiple data lines, a gate driving circuit outputting scanning signals to multiple gate lines, and the like.

To express a video, the subpixel may include a storage capacitor that may be charged at a predetermined voltage. In addition, the storage capacitor needs to be charged within a predetermined time. The predetermined time in which the storage capacitor is charged is limited, and there is a problem in that the storage capacitor may not be sufficiently charged.

SUMMARY

Accordingly, the present disclosure is directed to a display device and a driving method that substantially obviates one or more of problems due to limitations and disadvantages described above.

More specifically, the present disclosure is to provide a display device and a driving method capable of efficiently improving a pixel charging ratio.

In addition, in accordance with efficient improvement of a pixel charging ratio, the present disclosure provides a display device and a driving method capable of low-power driving.

Additional features and advantages of the disclosure will be set forth in the description which follows and in part will be apparent from the description, or may be learned by practice of the disclosure. Other advantages of the present disclosure will be realized and attained by the structure particularly pointed out in the written description and claims hereof as well as the appended drawings.

To achieve these and other advantages and in accordance with the present disclosure, as embodied and broadly described, a display device includes a driving transistor used for driving a light emitting element; a scanning transistor electrically connected between a first node that is a gate node of the driving transistor and a data line to which a data voltage is supplied; a storage capacitor electrically connected between a second node of the driving transistor and the first node; and a charging ratio sensing unit electrically connected to the data line through an input line, in which the charging ratio sensing unit senses a voltage charged in the storage capacitor through the input line.

In another aspect of the present disclosure, a driving method for a display device includes a capacitor voltage charging step of charging a storage capacitor included in a subpixel with a predetermined voltage; a charging ratio sensing unit initializing step of initializing a charging ratio sensing unit electrically connected to the subpixel; a charged voltage tracking step of tracking the predetermined voltage charged in the storage capacitor using the charging ratio sensing unit; and a charged voltage sampling step of sampling the predetermined voltage tracked by the charging ratio sensing unit.

According to various aspects of the present disclosure, a display device and a driving method capable of efficiently improving a pixel charging ratio may be provided.

According to various aspects of the present disclosure, a display device and a driving method capable of low-power driving may be provided in accordance with efficient improvement of a pixel charging ratio.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
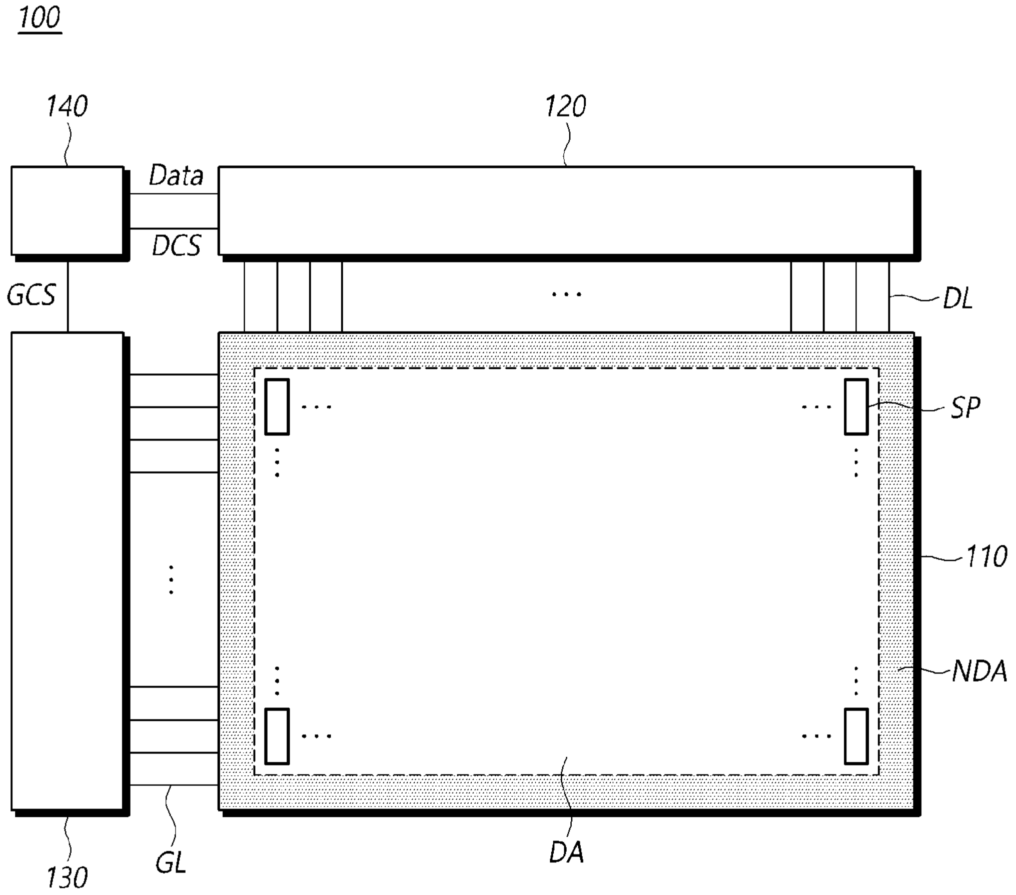
FIG. 1 is a system configuration diagram of a display device according to aspects of the present disclosure.

In the following description of examples or aspects of the present disclosure, reference will be made to the accompanying drawings in which it is shown by way of illustration specific examples or aspects that may be implemented, and in which the same reference numerals and signs may be used to designate the same or like components even when they are shown in different accompanying drawings from one another. Further, in the following description of examples or aspects of the present disclosure, detailed descriptions of well-known functions and components incorporated herein will be omitted when it is determined that the description may make the subject matter in some aspects of the present disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)", or "(B)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only may the first element "be directly connected or coupled to" or "directly contact or overlap" the second element, but a third element may also be "interposed" between the first and second elements, or the first and second elements may "be connected or coupled to", "contact or overlap", etc. each other via a fourth element. Here, the second element may be included in at least one of two or more elements that "are connected or coupled to", "contact or overlap," etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "may."

Hereinafter, various aspects of the present disclosure will be described in detail with reference to the attached drawings.

FIG. 1 is a system configuration diagram of a display device 100 according to aspects of the present disclosure.

Referring to FIG. 1, the display device 100 according to aspects of the present disclosure may include a display panel 110 and driving circuits used for driving the display panel 110.

The display panel 110 may include signal wirings such as multiple data lines DL and multiple gate lines GL and include multiple subpixels SP. The display panel 110 may include a display region DA in which a video is displayed and a non-display region NDA in which no video is displayed. In the display panel 110, multiple subpixels SP used for displaying an image are disposed in the display region DA, and, in the non-display region NDA, driving circuits 120, 130, 140 may be electrically connected, or the driving circuits 120, 130, 140 may be mounted, and a pad part to which integrated circuits or printed circuits, and the like are connected may be disposed.

The driving circuits may include a data driving circuit 120, a gate driving circuit 130, and the like and further include a controller 140 that controls the data driving circuit 120 and the gate driving circuit 130.

The data driving circuit 120 is a circuit for driving multiple data lines DL and may supply data signals to multiple data lines DL. The gate driving circuit 130 is a circuit for driving multiple gate lines GL and may supply gate signals to the multiple gate lines GL.

The gate driving circuit 130 may output a gate signal of a turn-on level voltage or output a gate signal of a turn-off level voltage in accordance with control of the controller 140. The gate driving circuit 130 may sequentially drive multiple gate lines GL by sequentially supplying gate signals of the turn-on level voltage to the multiple gate lines GL.

To control an operation timing of the data driving circuit 120, the controller 140 may supply a data control signal DCS to the data driving circuit 120. The controller 140 may supply a gate control signal GCS used for controlling an operation timing of the gate driving circuit 130 to the gate driving circuit 130.

The controller 140 may start scanning in accordance with a timing implemented in each frame, convert input video data input from the outside in accordance with a data signal format used by the data driving circuit 120, supply converted video data Data to the data driving circuit 120, and control data driving at an appropriate time according to scanning.

To control the data driving circuit 120 and the gate driving circuit 130, the controller 140 receives timing signals such as a vertical synchronization signal Vsync, a horizonal synchronization signal Hsync, an input data enable signal DE, and a clock signal CLK as inputs, generates various control signals DCS, GCS, and outputs the generated control signals to the data driving circuit 120 and the gate driving circuit 130.

The controller 140 may be implemented using a component that is separate from the data driving circuit 120 or may be integrated with the data driving circuit 120 and implemented as an integrated circuit.

The data driving circuit 120 receives video data Data from the controller 140 as an input and supplies data voltages to multiple data lines DL, thereby driving the multiple data lines DL. Here, the data driving circuit 120 is also referred to as a source driving circuit. Such a data driving circuit 120 may include one or more source driver integrated circuits (SDIC). Each source driver integrated circuit (SDIC) may include a shift register, a latch circuit, a digital to analog converter (DAC), an output buffer, and the like. Each source driver integrated circuit (SDIC) may further include an analog to digital converter (ADC) in some cases.

For example, each source driver integrated circuit (SDIC) may be connected to the display panel 110 using a tape automated bonding (TAB) method, may be connected to a bonding pad of the display panel 110 using a chip one glass (COG) or chip on panel (COP) method, or may be implemented using a chip on film (COF) method and connected to the display panel 110.

The gate driving circuit 130 may be connected to the display panel 110 using a tape automated bonding (TAB) method, may be connected to a bonding pad of the display panel 110 using a chip on glass (COG) or chip on panel (COP) method, or may be connected to the display panel 110 using a chip on film (COF) method. Alternatively, the gate driving circuit 130 may be disposed in the non-display region NDA of the display panel 110 as a gate in panel (GIP) type.

When a specific gate line GL is open in accordance with the gate driving circuit 130, the data driving circuit 120 may convert video data Data received from the controller 140 into a data voltage of an analog form and supply the data voltage to multiple data lines DL.

The data driving circuit 120 may be connected to one side (for example, an upper side or a lower side) of the display panel 110. Depending on a driving type, a panel design type, and the like, the data driving circuit 120 may be connected to both sides (for example, an upper side and a lower side) of the display panel 110 or may be connected to two or more side faces among four side faces of the display panel 110.

The gate driving circuit 130 may be connected to one side (for example, a left side or a right side) of the display panel 110. Depending on a driving type, a panel design type, and the like, the gate driving circuit 130 may be connected to both sides (for example, a left side and a right side) of the display panel 110 or may be connected to two or more side faces among four side faces of the display panel 110.

The controller 140 may be a timing controller 140 used in a general display technology, may be a control device that includes a timing controller 140 and may further perform another control function, or may be a control device other than a timing controller 140, or may be a circuit disposed inside a control device. The controller 140 may be implemented using various circuits and electronic components such as an integrated circuit (IC), a field programmable gate array (FPGA), an application specific integrated circuit (ASIC), a processor, and the like.

The controller 140 is mounted in a printed circuit board, a flexible printed circuit, or the like and may be electrically connected to the data driving circuit 120 and the gate driving circuit 130 through the printed circuit board, the flexible printed circuit, or the like. The controller 140 may transmit/receive signals to/from the data driving circuit 120 in accordance with one or more interfaces set in advance. For example, the interface may include a low voltage differential signaling interface (LVDS), an EPI interface, a serial peripheral interface (SPI), and the like. The controller 140 may include storage places such as one or more registers.

A display device 100 according to aspects of the present disclosure may be a self-emission display such as an organic light emitting diode (OLED) display, a quantum dot display, or a micro light emitting diode (LED) display.

Figure 2:
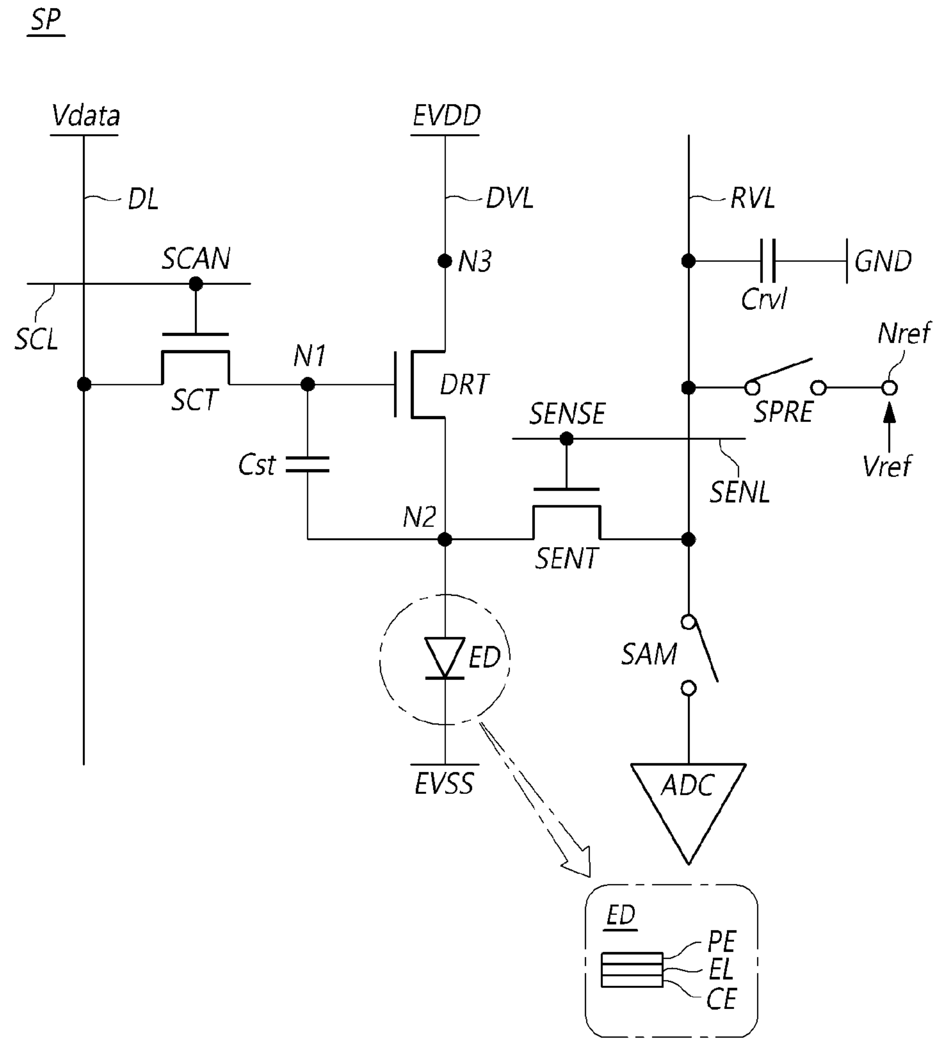
FIG. 2 is an equivalent circuit diagram of a subpixel of a display device according to aspects of the present disclosure.

FIG. 2 is an equivalent circuit diagram of a subpixel SP of the display device 100 according to aspects of the present disclosure.

Referring to FIG. 2, each of multiple subpixels SP disposed in the display panel 110 of the display device 100 according to aspects of the present disclosure may include a light emitting element ED, a driving transistor DRT, a scanning transistor SCT, a sensing transistor SENT, a storage capacitor Cst, and the like. In this way, in a case in which a subpixel SP includes three transistors DRT, SCT, SENT and one capacitor Cst, it is referred to as the subpixel SP having a 3T (transistor) 1C (capacitor) structure.

The light emitting element ED may include a pixel electrode PE and a common electrode CE and may include a light emitting layer EL positioned between the pixel electrode PE and the common electrode CE. Here, the pixel electrode PE is disposed in each subpixel SP, and the common electrode CE may be disposed to be common to multiple subpixels SP. For example, the pixel electrode PE may be an anode electrode, and the common electrode CE may be a cathode electrode. As another example, the pixel electrode PE may be a cathode electrode, and the common electrode CE may be an anode electrode. For example, the light emitting element ED may be an organic light emitting diode (OLED), a micro light emitting diode (LED), a quantum dot light emitting element (ED), or the like.

The driving transistor DRT is a transistor used for driving a light emitting element ED and may include a first node N1, a second node N2, a third node N3, and the like.

The first node N1 of the driving transistor DRT may be a gate node of the driving transistor DRT, and may be electrically connected also to a source node or a drain node of the scanning transistor SCT. The second node N2 of the driving transistor DRT may be a source node or a drain node of the driving transistor DRT, may be electrically connected to a source node or a drain node of the sensing transistor SENT and be electrically connected also to the pixel electrode PE of the light emitting element ED. The third node N3 of the driving transistor DRT may be electrically connected to a driving voltage line DVL that supplies a driving voltage EVDD.

The scanning transistor SCT is controlled in accordance with a scanning signal SCAN and may be connected between the first node N1 of the driving transistor DRT and the data line DL. The scanning transistor SCT is turned on or turned off in accordance with a scanning signal SCAN supplied from a scanning signal line SCL that is one type of gate line GL and may control connection between the data line DL and the first node N1 of the driving transistor DRT.

The scanning transistor SCT is turned on in accordance with a scanning gate signal SCAN having a turn-on level voltage and may transfer a data voltage Vdata supplied from the data line DL to the first node N1 of the driving transistor DRT.

A turn-on level voltage of the scanning signal SCAN that is able to turn on the scanning transistor SCT may be either a high-level voltage or a low-level voltage. A turn-off level voltage of the scanning signal SCAN that is able to turn off the scanning transistor SCT may be either a high-level voltage or a low-level voltage. For example, in a case in which the scanning transistor SCT is an n-type transistor, the turn-on level voltage may be a high-level voltage, and the turn-off level voltage may be a low-level voltage. As another example, in a case in which the scanning transistor SCT is a p-type transistor, the turn-on level voltage may be a low-level voltage, and the turn-off level voltage may be a high-level voltage.

The sensing transistor SENT is controlled in accordance with a sensing signal SENSE and may be connected between the second node N2 of the driving transistor DRT and a reference voltage line RVL. The sensing transistor SENT is turned on or turned off in accordance with a sensing signal SENSE supplied from a sensing signal line SENL that is another type of gate line GL and may control connection between the reference voltage line RVL and the second node N2 of the driving transistor DRT.

The sensing transistor SENT is turned on in accordance with a sensing signal SENSE having a turn-on level voltage and may transfer a reference voltage Vref supplied from the reference voltage line RVL to the second node N2 of the driving transistor DRT.

The turn-on level voltage of the sense signal SENSE that is able to turn on the sensing transistor SENT may be either a high-level voltage or a low-level voltage. The turn-off level voltage of the sense signal SENSE that is able to turn off the sensing transistor SENT may be either a high-level voltage or a low-level voltage. For example, in a case in which the sensing transistor SENT is an n-type transistor, the turn-on level voltage may be a high-level voltage, and the turn-off level voltage may be a low-level voltage. As another example, in a case in which the sensing transistor SENT is a p-type transistor, the turn-on level voltage may be a low-level voltage, and the turn-off level voltage may be a high-level voltage.

On the other hand, the display device 100 may further include a line capacitor Crvl formed between the reference voltage line RVL and the ground GND, a sampling switch SAM controlling connection between the reference voltage line RVL and the analog-to-digital converter ADC, and a power switch SPRE controlling connection between the reference voltage line RVL and a reference voltage supply node Nref. The reference voltage Vref output from a power supply device may be supplied to the reference voltage supply node Nref and be applied to the reference voltage line RVL through the power switch SPRE.

The sensing transistor SENT is turned on in accordance with a sensing signal SENSE having a turn-on level voltage and may transfer a voltage V2 of the second node N2 of the driving transistor DRT to the reference voltage line RVL. In accordance with this, the line capacitor Crvl formed between the reference voltage line RVL and the ground GND is able to be charged.

The function of the sensing transistor SENT for delivering the voltage V2 of the second node N2 of the driving transistor DRT to the reference voltage line RVL may be used at the time of driving for sensing characteristic values of the subpixel SP. In such a case, the voltage delivered to the reference voltage line RVL may be a voltage used for calculating characteristic values of the subpixel SP or a voltage in which the characteristic values of the subpixel SP are reflected.

In the present disclosure, characteristic values of a subpixel SP may be characteristic values of the driving transistor DRT or the light emitting element ED. The characteristic values of the driving transistor DRT may include a threshold voltage, mobility, and the like of the driving transistor DRT. The characteristic values of the light emitting element ED may include a threshold voltage of the light emitting element ED.

Each of the driving transistor DRT, the scanning transistor SCT, and the sensing transistor SENT may be either an n-type transistor or a p-type transistor. In the present disclosure, for convenience of description, a case in which each of the driving transistor DRT, the scanning transistor SCT, and the sensing transistor SENT is the n-type transistor will be described as an example.

The storage capacitor Cst may be connected between the first node N1 and the second node N2 of the driving transistor DRT. In the storage capacitor Cst, an electric charge amount corresponding to a voltage difference between both ends is charged, and the storage capacitor Cst has a role for maintaining a voltage difference between both the ends for a set frame time. In accordance with this, a corresponding subpixel SP may emit light for the set frame time.

The storage capacitor Cst may be not a parasitic capacitor (for example, Cgs or Cgd) that is an internal capacitor present between the gate node and the source node (or the drain node) of the driving transistor DRT but an external capacitor that is intentionally designed outside the driving transistor DRT.

The scanning signal line SCL and the sensing signal line SENL may be mutually-different gate lines GL. In such a case, the scanning gate signal SCAN and the sensing gate signal SENSE may be individual gate signals, and an on-off timing of the scanning transistor SCT and an on-off timing of the sensing transistor SENT disposed inside one subpixel SP may be independent from each other. In other words, the on-off timing of the scanning transistor SCT and the on-off timing of the sensing transistor SENT inside one subpixel SP may be the same or be different from each other.

Differently from this, the scanning signal line SCL and the sensing signal line SENL may be the same gate line GL. In other words, a gate node of the scanning transistor SCT and a gate node of the sensing transistor SENT inside one subpixel SP may be connected to one gate line GL. In such a case, the scanning gate signal SCAN and the sensing gate signal SENSE may be the same gate signal, and the on-off timing of the scanning transistor SCT and the on-off timing of the sensing transistor SENT inside one subpixel SP may be the same.

On the other hand, the reference voltage line RVL may be disposed for every one subpixel SP column. Differently from this, the reference voltage line RVL may be disposed for every two or more subpixel SP columns. In a case in which the reference voltage line RVL is disposed for every two or more subpixel SP columns, a plurality of subpixels SP may receive supply of a reference voltage Vref from one reference voltage line RVL.

Figure 3:
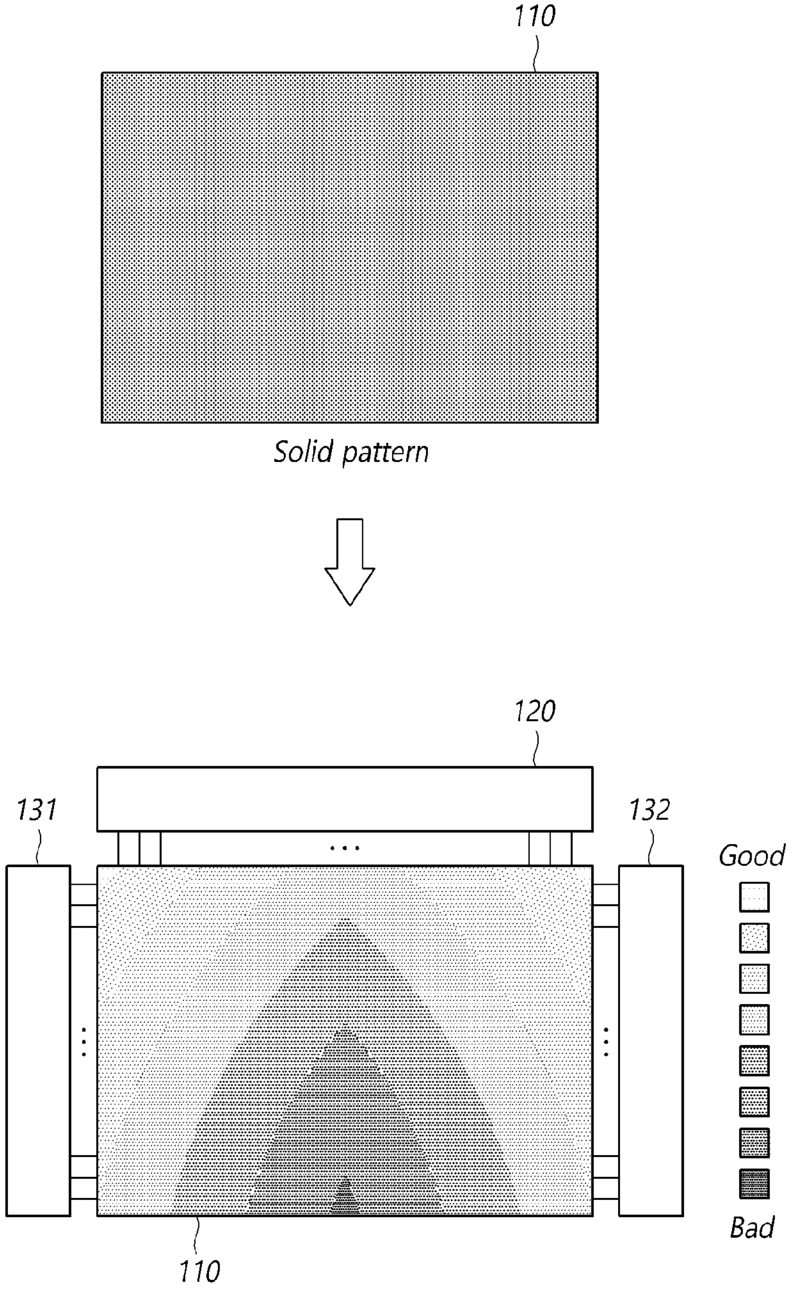
FIGS. 3 and 4 are diagrams for describing a charging ratio of a storage capacitor disposed in a display panel according to aspects of the present disclosure.
Figure 4:
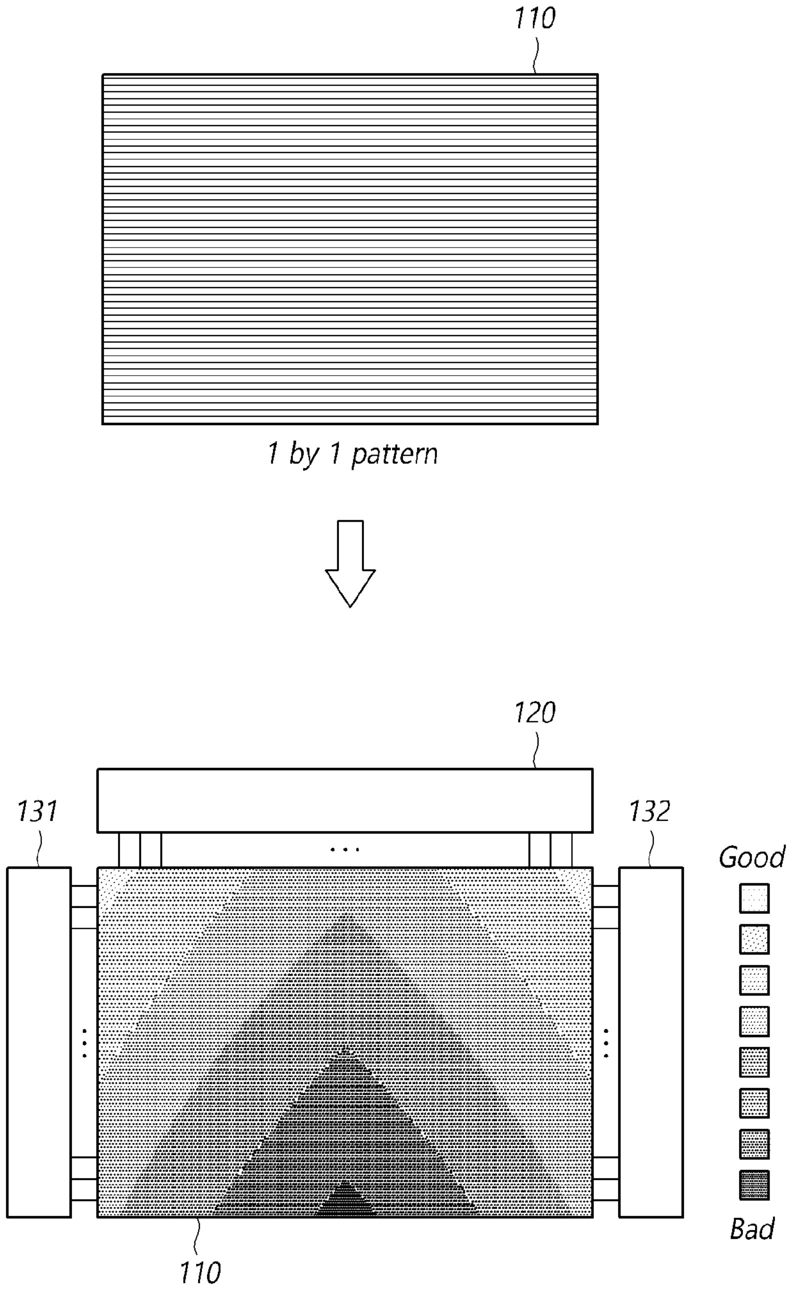
Figure 5:
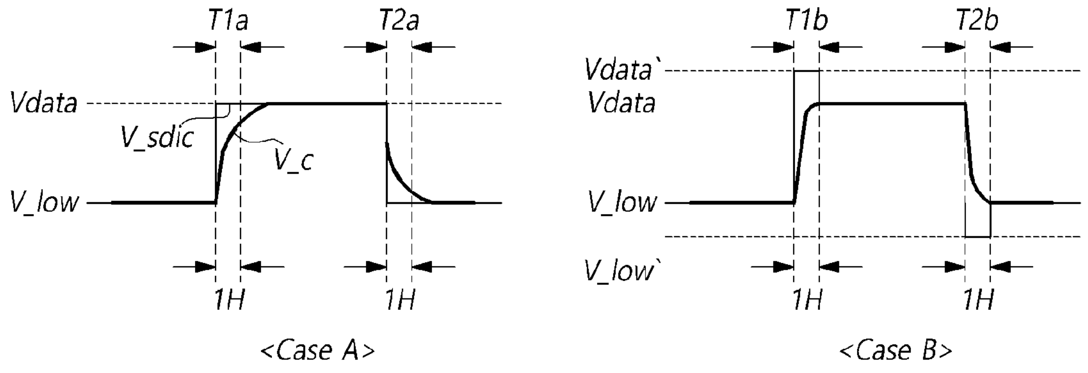
FIG. 5 is a diagram for describing pixel over driving according to aspects of the present disclosure.

FIGS. 3 and 4 are diagrams for describing a charging ratio of a storage capacitor Cst disposed in a display panel 110 according to aspects of the present disclosure. FIG. 5 is a diagram for describing pixel over driving according to aspects of the present disclosure.

In the display panel 110, multiple subpixels SP may be disposed, and each subpixel SP may include a storage capacitor Cst. To display a frame video on the display panel 110, both ends of the storage capacitor Cst may be charged with a predetermined voltage.

After both ends of the storage capacitor Cst are charged with a predetermined voltage, multiple subpixels SP may emit light with luminance corresponding to the predetermined voltage. Thus, only when both the ends of the storage capacitor Cst are charged in correspondence with a predetermined voltage, a frame video may be displayed through the display panel 110.

However, there are differences in lengths of wirings through which multiple storage capacitors Cst disposed in the display panel 110 receive voltages from the data driving circuit 120, and there are differences in distances at which the multiple subpixels SP including the storage capacitors Cst described above receive supply of scanning signals SCAN from the gate driving circuits 131, 132. Due to the differences described above, a time required for a voltage between both ends of a storage capacitor Cst to be completely charged to a predetermined voltage may differ in accordance with an arrangement position of the storage capacitor Cst.

Meanwhile, a time in which the voltage between both ends of the storage capacitor Cst is charged to a predetermined voltage cannot be unlimited, and thus there may be a problem in that the voltage between both the ends of the storage capacitor Cst is not charged up to a predetermined voltage for a limited time. The problem described above may be referred to as a "pixel charging ratio decrease problem."

Referring to FIG. 3, a single-color pattern (Solid Pattern) video may be displayed on the display panel 110.

The pixel charging ratio may be different in accordance with a position in the display panel 110 at which the storage capacitor Cst disposed in the display panel 110 is disposed.

Referring to FIG. 3, for example, the data driving circuit 120 may be disposed at an upper end of the display panel 110. In such a case, a length of a wiring through which a storage capacitor Cst receives supply of a voltage from the data driving circuit 120 becomes longer from the upper side to the lower side in the display panel 110, and, in accordance therewith, the pixel charging ratio may further decrease as the storage capacitor Cst is disposed on a further lower side in the display panel 110.

In addition, referring to FIG. 3, the gate driving circuits 131, 132 may be disposed at both horizontal ends of the display panel 110. If only the first gate driving circuit 131 is disposed on a left side in the display panel 110, as a subpixel SP is disposed farther from the first gate driving circuit 131, a time required for the subpixel SP to receive a scanning signal SCAN from the first gate driving circuit 131 becomes longer, and thus the pixel charging ratio may be decreased. Referring to FIG. 3, the first gate driving circuit 131 may be disposed on the left side in the display panel 110, and the second gate driving circuit 132 may be disposed on the right side in the display panel 110, and thus a charging ratio of the storage capacitor Cst disposed at a center part of the display panel 110 may be the lowest.

In other words, the data driving circuit 120 may be disposed on the upper side in the display panel 110, and the first gate driving circuit 131 and the second gate driving circuit 132 may be disposed on left and right sides in the display panel 110. In other words, the pixel charging ratio of the storage capacitor Cst may be further low from the left-side upper end of the display panel 110 to the center lower side, and the pixel charging ratio of the storage capacitor Cst may be further low from the right-side upper end of the display panel 110 to the center lower side. This may be referred to as "pixel charging ratio decrease according to a position."

Meanwhile, referring to FIG. 4, a one-by-one pattern video in which two colors are alternated in a horizontal direction may be displayed on the display panel 110. For example, when a scanning signal SCAN1 is supplied to a first gate line GL1, a high-grayscale data voltage Vdata_H that is a data voltage Vdata used for representing a high grayscale may be supplied to subpixels SP that are electrically connected to the first gate line GL1. Thereafter, when a scanning signal SCAN2 is supplied to a second gate line GL2, a low-grayscale data voltage Vdata_L that is a data voltage Vdata used for representing a low grayscale may be supplied to subpixels SP that are electrically connected to the second gate line GL2.

In such a case, the high-grayscale data voltage Vdata_H and the low-grayscale data voltage Vdata_L may have mutually-different voltage values, and, in a case in which a difference between the voltage values is large, a time required for a voltage transition may be long. In other words, as the voltage transition becomes larger, a rising time required for a voltage between both ends of the storage capacitor Cst to rise to a predetermined voltage and a falling time required for the voltage between both ends of the storage capacitor Cst to fall to a predetermined voltage may become longer, and, in accordance therewith, the pixel charging ratio may be decreased. This may be referred to as "pixel charging ratio decrease according to a pattern."

The "pixel charging ratio decrease according to a pattern" problem may appear in a frame video in which the color is changed and may appear severely particularly in a one-by-one pattern video.

Referring to FIGS. 3 and 4, while only the "pixel charging ratio decrease according to a position" problem occurs in the display panel 110 illustrated in FIG. 3, the "pixel charging ratio decrease according to a pattern" problem may also occur in the display panel 110 illustrated in FIG. 4 in addition to the "pixel charging ratio decrease according to a position".

In other words, it may be checked that the pixel charging ratio decrease problem occurring in the display panel 110 illustrated in FIG. 4 is more serious than the pixel charging ratio decrease problem occurring in the display panel 110 illustrated in FIG. 3.

To solve the pixel charging ratio decrease problems described above, "pixel over driving (POD) based on predicted values" may be performed.

Referring to FIG. 5, a voltage waveform represented in "Case A" is premised on a case in which pixel over driving (POD) based on predicted values is not applied, and the voltage waveform of "Case A" illustrates a voltage V_sdic supplied from the data driving circuit 120 and a voltage V_c with which the subpixel SP is supplied.

It may be checked that, although the subpixel SP may have supply of a data voltage Vdata for a 1a-th period T1*a*, a voltage supplied to the subpixel SP for 1H that is a limited time has not risen to the data voltage Vdata. In addition, it may be checked that, although the subpixel SP may have supply of a low voltage V_low for a 2a-th period T2*a*, a voltage supplied to the subpixel SP for 1H that is a limited time has not fallen to the low voltage V_low. In other words, it may be checked that a pixel charging ratio decrease problem occurs in Case A.

To solve the pixel charging ratio decrease problem described above, pixel over driving based on predicted values may be applied.

Referring to FIG. 5, a voltage waveform of "Case B" is premised on a case in which pixel over driving (POD) based on predicted values is applied, and the voltage waveform of "Case B" illustrates a voltage V_sdic' supplied from the data driving circuit 120 and a voltage V_c' with which the subpixel SP is supplied.

The subpixel SP may have supply of the data voltage Vdata' of which a magnitude has been changed for a 1b-th period T1*b*, and, in accordance therewith, the voltage of the subpixel SP may rise to the data voltage Vdata for 1H that is a limited time. In addition, the subpixel SP may have supply of the low voltage V_low' of which a magnitude has been changed for a 2b-th period T2*b*, and, in accordance therewith, the voltage of the subpixel SP may fall to the low voltage V_low for 1H that is a limited time.

In other words, although the pixel charging ratio decrease problem may be solved through "pixel over driving (POD) based on predicted values," there are the following problems.

The "pixel over driving (POD) based on predicted values" is on the basis of a method of predicting a degree of decrease of the pixel charging ratio, and thus, a predicted degree of pixel charging ratio decrease and an actual pixel charging ratio decrease may not coincide with each other, and, in accordance therewith, there is a limit of the pixel charging ratio problem not being soundly solved.

In addition, even in a case in which a pixel charging ratio decrease problem of a specific display device 100 is perfectly predicted, there is a problem in that the predicted value described above cannot be applied to a process in which the display device 100 is manufactured, elements included in the display device 100, and a display device of a different type.

To solve the problems described above, aspects of the present disclosure may provide a display device 100 and a driving method capable of efficiently improving a pixel charging ratio.

The aspects of the present disclosure may provide a display device 100 and a driving method capable of performing low-power driving in accordance with efficient improvement of the pixel charging ratio. Detailed description will be presented as below.

Figure 6:
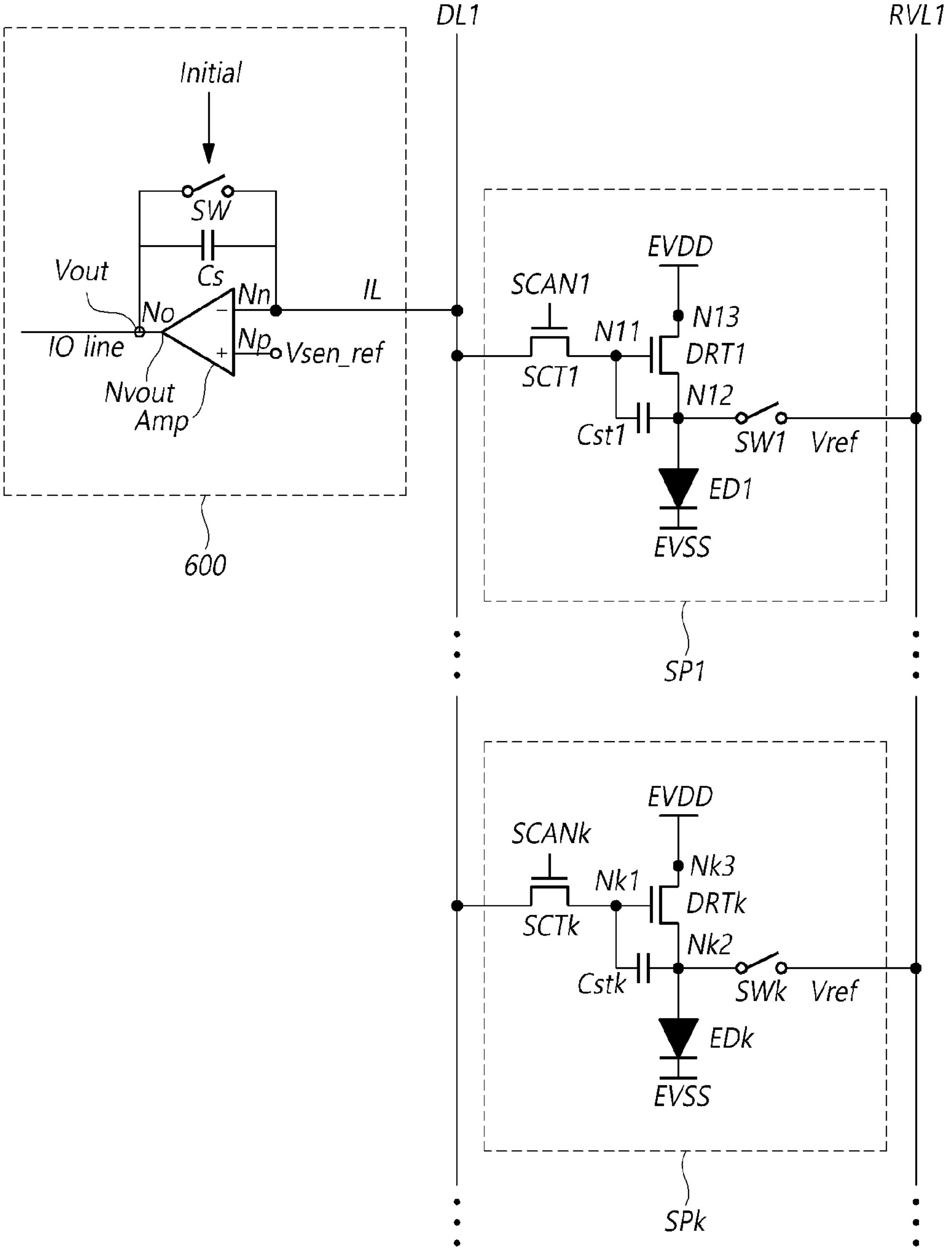
FIG. 6 is an equivalent circuit diagram of subpixels and a charging ratio sensing unit according to aspects of the present disclosure.

FIG. 6 is an equivalent circuit diagram of subpixels SP and a charging ratio sensing unit 600 according to aspects of the present disclosure.

Referring to FIG. 6, a first subpixel SP1, a k-th subpixel SPk, and the charging ratio sensing unit 600 may be electrically connected to a first data line DL1.

The first subpixel SP1 may include a first light emitting element ED1, a first driving transistor DRT1, a first scanning transistor SCT1, a first storage capacitor Cst1, and a first switch SW1.

The first light emitting element ED1 may be supplied with a driving current Id1 from the first driving transistor DRT1 to emit light.

The first light emitting element ED1 may be electrically connected between a node to which a ground voltage EVSS is supplied and a second node N12 of the first driving transistor DRT1.

The first driving transistor DRT1 may be a transistor used for driving the first light emitting element ED1.

The first driving transistor DRT1 may include a first node N11 that is a gate node, a second node N12 that is a source node, and a third node N13 that is a drain node.

The first node N11 of the first driving transistor DRT1 may have supply of a data voltage Vdata in accordance with control of the first scanning transistor SCT1.

The second node N12 of the first driving transistor DRT1 may be electrically connected to the first storage capacitor Cst1, the first light emitting element ED1, and the first switch SW1.

A reference voltage Vref may be supplied to the second node N12 of the first driving transistor DRT1 in accordance with control of the first switch SW1.

A driving voltage EVDD may be supplied to the third node N13 of the first driving transistor DRT1.

The first scanning transistor SCT1 may control connection between the first data line DL1 and the first node N11 in accordance with supply of a first scanning signal SCAN1.

The first scanning transistor SCT1 may be electrically connected between the first data line DL1 and the first node N11.

The first scanning transistor SCT1 may have a gate node to have supply of the first scanning signal SCAN1.

The first storage capacitor Cst1 may maintain a voltage between both ends thereof for a predetermined time. In accordance with the voltage between both the ends of the first storage capacitor Cst1 being maintained for a predetermined time, a frame video may be displayed on the display panel 110.

The first storage capacitor Cst1 may be electrically connected between the first node N11 and the second node N12.

The first switch SW1 may be electrically connected between the second node N12 and a node to which the reference voltage Vref is supplied.

In accordance with control of the first switch SW1, the reference voltage Vref may be supplied to the second node N12. Although the first switch SW1 may be controlled by receiving supply of the first scanning signal SCAN1, the first switch SW1 may be controlled through a signal other than the first scanning signal SCAN1.

The first switch SW1 may be a switching element, and the first switch SW1 may be a transistor performing a switching function.

The k-th subpixel SPk may include a k-th light emitting element EDk, a k-th driving transistor DRTk, a k-th scanning transistor SCTk, a k-th storage capacitor Cstk, and a k-th switch SWk.

The k-th light emitting element EDk may be supplied with a driving current Idk from the k-th driving transistor DRTk to emit light.

The k-th light emitting element EDk may be electrically connected between a node to which a ground voltage EVSS is supplied and a second node Nk2 of the k-th driving transistor DRTk.

The k-th driving transistor DRTk may be a transistor used for driving the k-th light emitting element EDk.

The k-th driving transistor DRTk may include a first node Nk1 that is a gate node, a second node Nk2 that is a source node, and a third node Nk3 that is a drain node.

The first node Nk1 of the k-th driving transistor DRTk may have supply of a data voltage Vdata in accordance with control of the k-th scanning transistor SCTk.

The second node Nk2 of the k-th driving transistor DRTk may be electrically connected to the k-th storage capacitor Cstk, the k-th light emitting element EDk, and the k-th switch SWk.

The reference voltage Vref may be supplied to the second node Nk2 of the k-th driving transistor DRTk in accordance with control of the k-th switch SWk.

The driving voltage EVDD may be supplied to the third node Nk3 of the k-th driving transistor DRTk.

The k-th scanning transistor SCTk may control connection between the first data line DL1 and the first node Nk1 in accordance with supply of a k-th scanning signal SCANk.

The k-th scanning transistor SCTk may be electrically connected between the first data line DL1 and the first node Nk1.

The k-th scanning transistor SCTk may have a gate node to have supply of the k-th scanning signal SCANk.

The k-th storage capacitor Cstk may maintain a voltage between both ends thereof for a predetermined time. In accordance with the voltage between both the ends of the k-th storage capacitor Cstk being maintained for a predetermined time, a frame video may be displayed on the display panel 110.

The k-th storage capacitor Cstk may be electrically connected between the first node Nk1 and the second node Nk2.

The k-th switch SWk may be electrically connected between the second node Nk2 and a node to which the reference voltage Vref is supplied.

In accordance with control of the k-th switch SWk, the reference voltage Vref may be supplied to the second node Nk2. Although the k-th switch SWk may be controlled by receiving supply of the k-th scanning signal SCANk, the k-th switch SWk may be controlled through a signal other than the k-th scanning signal SCANk.

The k-th switch SWk may be a switching element, and the k-th switch SWk may be a transistor performing a switching function.

The charging ratio sensing unit 600 may sense a voltage charged in the storage capacitor Cst included in the subpixel SP through an input line IL. The charging ratio sensing unit 600 may be electrically connected to the first data line DL1 through the input line IL. A storage capacitor Cst may be included in the subpixel SP that is electrically connected to the first data line DL1, and the charging ratio sensing unit 600 may sense a voltage charged in the storage capacitor Cst in accordance with electrical connection with the storage capacitor Cst.

After the charging ratio sensing unit 600 senses a sensing voltage Vsen that is a voltage charged in the storage capacitor Cst, a charging ratio C_ratio of the storage capacitor Cst may be derived on the basis of the sensing voltage Vsen. The charging ratio C_ratio of a storage capacitor Cst may be a value acquired by comparing a voltage between both ends of a storage capacitor Cst charged in correspondence with a data voltage and a voltage between both ends of the storage capacitor Cst that is a measurement target.

After the charging ratio C_ratio of the storage capacitor Cst is derived, a charging ratio change value C_ratio' may be derived on the basis of the charging ratio C_ratio. Thereafter, voltage gain ratios a corresponding to the charging ratio change values C_ratio' are calculated, and changed data voltages Vdata' acquired by applying the voltage gain ratios a corresponding to the charging ratio change values C_ratio' to the data voltages Vdata are supplied to the data lines DL, whereby the pixel charging ratio may be efficiently improved.

In other words, the data voltage Vdata may be changed to a changed data voltage Vdata' on the basis of the charging ratio C_ratio of the storage capacitor Cst sensed in a subpixel charging ratio sensing period Tsp, and the changed data voltage Vdata' may be supplied to the data line DL.

The charging ratio sensing unit 600 may be included in the display panel 110 in which multiple subpixels SP are disposed or may be included in the data driving circuit 120 that supplies a voltage to the data line DL. In other words, there is no restriction on a position at which the charging ratio sensing unit 600 is disposed.

The charging ratio sensing unit 600 used for the function described above may be variously designed. The charging ratio sensing unit 600 may be configured using a circuit for sensing a voltage charged in the storage capacitor Cst or an amount of electric charge such as an integrator, a comparator, or an ammeter. In other words, there is no restriction on the configuration of the charging ratio sensing unit 600. Hereinafter, one aspect in which the charging ratio sensing unit 600 is configured using an integrator will be described.

The charging ratio sensing unit 600 may include an operational amplifier Amp, a sensing capacitor Cs, and an initialization switch SW. The charging ratio sensing unit 600 may be configured using an amplification circuit having an integrator function.

The operational amplifier Amp may include a non-inverting terminal+, an inverting terminal−, and an output terminal Nvout.

The non-inverting terminal+ of the operational amplifier Amp may be electrically connected to a non-inverting node Np. A sensing reference voltage Vsen_ref may be supplied to the non-inverting node Np. In other words, the sensing reference voltage Vsen_ref may be supplied to the non-inverting terminal+ of the operational amplifier Amp.

The inverting terminal− of the operational amplifier Amp may be electrically connected to an inverting node Nn. The input line IL, the sensing capacitor Cs, and the initialization switch SW may be electrically connected to the inverting terminal−. The first data line DL1 may be electrically connected to the inverting terminal− through the input line IL.

The output terminal Nvout of the operational amplifier Amp may be electrically connected to an output node No. The sensing capacitor Cs, the initialization switch SW, and an input/output line (IO line) may be electrically connected to the output node No.

The input/output line (IO line) may be electrically connected to the output node No.

The sensing capacitor Cs may be electrically connected between the output node No and the inverting node Nn.

The initialization switch SW may be electrically connected between the output node No and the inverting node Nn. The initialization switch SW may receive supply of an initialization signal Initial. The initialization switch SW may control connection between the output node No and the inverting node Nn in accordance with the initialization signal Initial.

When the initialization switch SW receives supply of the initialization signal Initial of a turn-on signal, the output node No and the inverting node Nn may be electrically connected to each other.

As described above, the charging ratio sensing unit 600 may be configured using an amplification circuit having an integrator function. The sensing capacitor Cs included in the charging ratio sensing unit 600 may be initialized with a predetermined voltage. Thereafter, a current may be supplied through the inverting terminal− of the operational amplifier Amp, and, in accordance with supply of the current, a voltage level of the voltage Vout of the output node No may decrease from a predetermined voltage level over time. In a state in which the voltage level of the voltage Vout of the output node No is decreasing, the charging ratio sensing unit 600 may sense the voltage Vout of the output node No of a specific time point.

Hereinafter, pixel charging ratio sensing driving of the display device 100 will be described in more detail.

Figure 7:
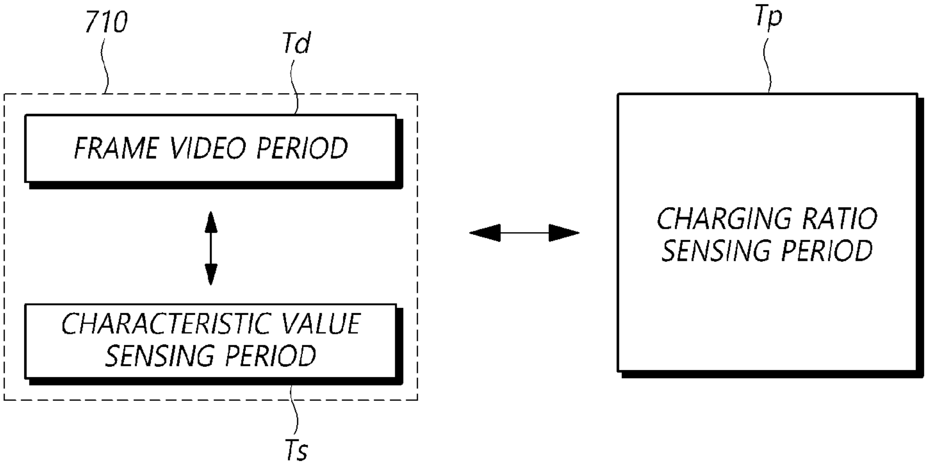
FIG. 7 is a diagram illustrating a driving method for display device according to aspects of the present disclosure.
Figure 8:
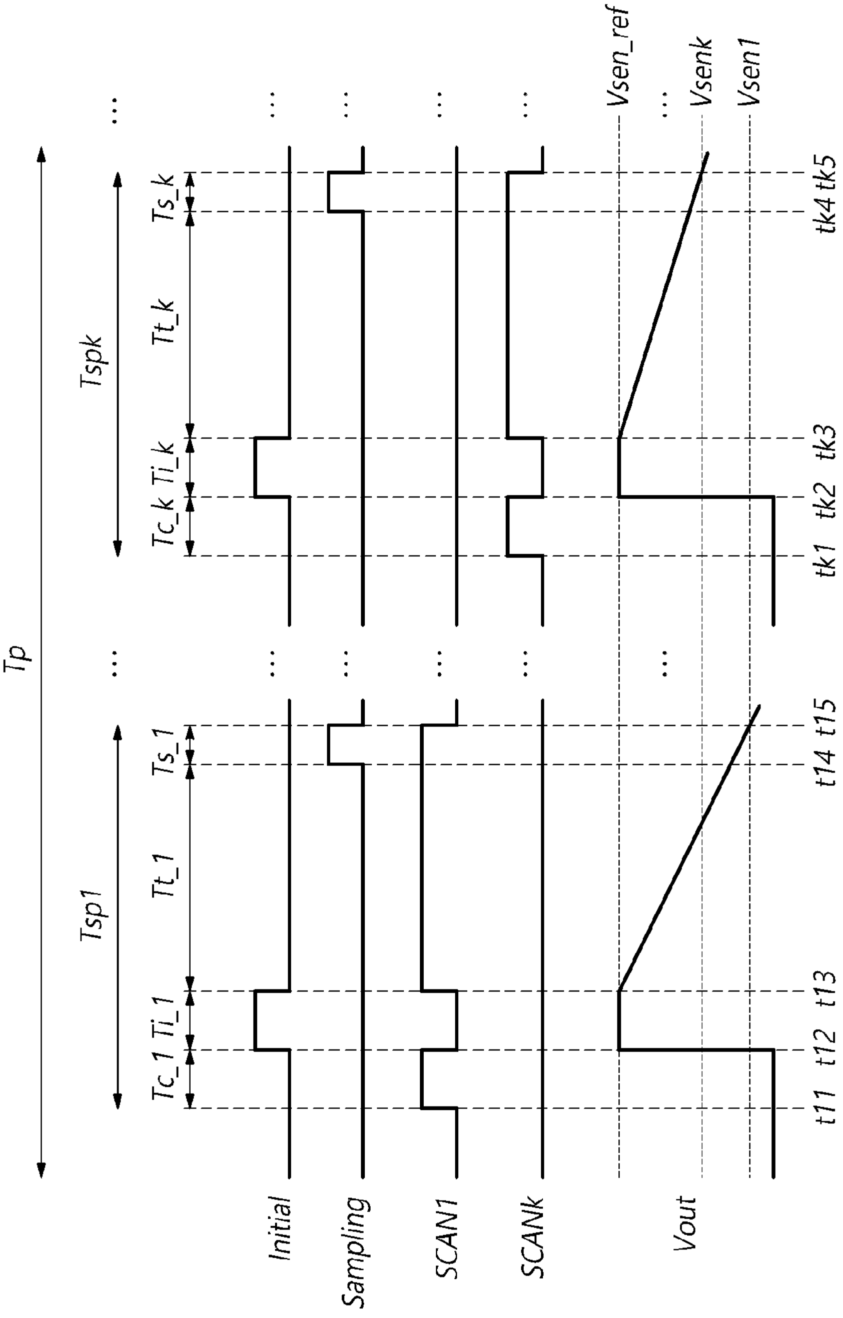
FIG. 8 is a timing diagram of pixel charging ratio sensing driving of a display device according to aspects of the present disclosure.

FIG. 7 is a diagram illustrating a driving method for the display device 100 according to aspects of the present disclosure. FIG. 8 is a timing diagram of pixel charging ratio sensing driving of a display device 100 according to aspects of the present disclosure.

Referring to FIG. 7, periods of the display device 100 may include a frame video period Td, a characteristic value sensing period Ts, and a charging ratio sensing period Tp.

The frame video period Td may be a period for displaying a frame video on the display panel 110.

The characteristic value sensing period Ts may be a period for sensing a characteristic value of the subpixel SP. For example, the characteristic value sensing period Ts may advance during a power-on period in which the display device 100 receives supply of power in a power-off state, a period in which the display device 100 is driven in real time, and a power-off period in which the power of the display device 100 is off in a power-on state.

The frame video period Td and the characteristic value sensing period Ts may be alternately driven. For example, the frame video period Td may be a period advancing during an active period Act, and the characteristic value sensing period Ts may be a period advancing in a blank period Blank. A period in which the frame video period Td and the characteristic value sensing period Ts are alternated may be a general video period 710. The general video period 710 may be divided into an active period Act in which the vertical synchronization signal Vsync is at a high level and a blank period Blank in which the vertical synchronization signal Vsync is at a low level.

The charging ratio sensing period Tp may be a period for sensing charging ratios of the storage capacitors Cst included in multiple subpixels SP.

The charging ratio sensing period Tp may be a period driven for the charging ratio sensing unit 600 to sense the charging ratio C_ratio of the storage capacitor Cst.

The charging ratio sensing period Tp may include a charging period Tc in which both ends of the storage capacitor Cst is charged with the voltage, an initialization period Ti in which the charging ratio sensing unit 600 is initialized, a tracking period Tt in which a voltage charged in the storage capacitor Cst is tracked, a sampling period Ts in which a tracked voltage is sensed, a charging ratio LUT generation period, and the like.

The charging ratio sensing period Tp may advance in a period different from the general video period 710. The charging ratio sensing period Tp may advance in a period different from the frame video period Td in which a light emitting element emits light, and a frame video is displayed.

After the general video period 710 advances multiple times, the charging ratio sensing period Tp may advance. In addition, the charging ratio sensing period Tp may advance alternately with the general video period 710.

Referring to FIG. 8, the charging ratio sensing period Tp may include multiple subpixel charging ratio sensing periods Tsp. The subpixel charging ratio sensing period Tsp may be a period in which pixel charging ratios of multiple subpixels SP are sensed. The subpixel charging ratio sensing period Tsp may include a charging period Tc, an initialization period Ti, a tracking period Tt, and a sampling period Ts.

The multiple subpixel charging ratio sensing period Tsp may include a first subpixel charging ratio sensing period Tsp1 and a k-th subpixel charging ratio sensing period Tspk. The multiple subpixel charging ratio sensing periods Tsp may sequentially advance, and, after a first subpixel charging ratio sensing period Tsp1 advances, a second subpixel charging ratio sensing period Tsp2 may advance. Referring to FIG. 8, for the convenience of description, among the multiple subpixel charging ratio sensing periods Tsp, only the first subpixel charging ratio sensing period Tsp1 and the k-th subpixel charging ratio sensing period Tspk are illustrated.

Referring to FIG. 8, the first subpixel charging ratio sensing period Tsp1 may be a period in which the charging ratio C_ratio of the first storage capacitor Cst1 included in the first subpixel SP1 is sensed.

The first subpixel charging ratio sensing period Tsp1 may be a period in which the first subpixel SP1 electrically connected to the first gate line GL1 is sensed.

The first subpixel charging ratio sensing period Tsp1 may include a first charging period Tc_1, a first initialization period Ti_1, a first tracking period Tt_1, and a first sampling period Ts_1.

The first charging period Tc_1 may be a period from an 11th time point t11 to a 12th time point t12.

The first charging period Tc_1 may be a period in which the storage capacitor Cst included in the subpixel SP is charged with a predetermined voltage.

During the first charging period Tc_1, a scanning signal SCAN may be supplied to the subpixel SP. For example, a first scanning signal SCAN1 may be supplied to the first subpixel SP1, and, in accordance therewith, the first scanning transistor SCT1 may be switched to a turn-on state. At this time, a turn-on signal may be supplied also to the first switch SW1, a reference voltage Vref may be supplied to the second node N12, and the turn-on signal supplied to the first switch SW1 may be a first scanning signal SCAN1. In other words, during the first charging period Tc_1, both ends of the first storage capacitor Cst1 are in a state being able to be supplied with a voltage.

During the first charging period Tc_1, a predetermined voltage may be supplied to both ends of the storage capacitor Cst. For example, the data voltage Vdata may be supplied to the first node N11 to which the first storage capacitor Cst1 is connected, and the reference voltage Vref may be supplied to the second node N12 to which the first storage capacitor Cst1 is connected. In accordance therewith, the first storage capacitor Cst1 may be charged with a voltage value corresponding to a voltage difference between both ends thereof.

During the first charging period Tc_1, a data voltage Vdata used for displaying a single-color pattern (Solid Pattern) video may be supplied. Different from the description presented above, during the first charging period Tc_1, a data voltage Vdata used for displaying a one-by-one pattern video may be supplied. In other words, during the first charging period Tc_1, a data voltage Vdata used for displaying a video of any of various patterns may be supplied.

A process in which a voltage is supplied to both ends of the storage capacitor Cst during the first charging period Tc_1 may be the same as the process for displaying a frame video on the display panel 110 during the frame video period Td. Since the processes are the same, the charging ratio C_ratio of the storage capacitor Cst of the frame video period Td may be sensed also through the process of sensing a pixel charging ratio.

The first charging period Tc_1 may advance for a predetermined period. For example, the first charging period may advance for an 1H period but is not limited thereto.

The first initialization period Ti_1 may be a period from the 12th time point t12 to a 13th time point t13.

The first initialization period Ti_1 may be a period in which the charging ratio sensing unit 600 is initialized.

During the first initialization period Ti_1, the initialization signal Initial of the turn-on level may be supplied to the initialization switch SW. In accordance with supply of the initialization signal Initial of the turn-on level, the initialization switch SW may electrically connect the output node No and the inverting node Nn.

The sensing reference voltage Vsen_ref may be supplied to the non-inverting terminal+ of the operational amplifier Amp, and thus the sensing reference voltage Vsen_ref may be formed also in the inverting terminal− of the operational amplifier Amp. Since the output node No and the inverting node Nn are in an electrically-connected state, the sensing reference voltage Vsen_ref may be supplied to the output node No. In accordance therewith, the voltage Vout of the output node No may be the sensing reference voltage Vsen_ref. In other words, the first initialization period Ti_1 may be a period in which the voltage Vout of the output node No becomes the sensing reference voltage Vsen_ref.

The first tracking period Tt_1 may be a period from the 13th time point t13 to a 14th time point t14.

The first tracking period Tt_1 may be a period in which a predetermined voltage charged in the first storage capacitor Cst1 is tracked by the charging ratio sensing unit 600.

The first tracking period Tt_1 may be a period in which the voltage Vout of the output node No is tracked by the voltage of the first storage capacitor Cst1.

During the first tracking period Tt_1, the initialization signal Initial of the turn-off level may be supplied to the initialization switch SW. In accordance therewith, the output node No and the inverting node Nn may be in a state not being electrically connected to each other. At this time, the charging ratio sensing unit 600 may be configured using an integrator circuit. The charging ratio sensing unit 600 may be supplied with a current through the inverting terminal− of the operational amplifier Amp, and, in accordance with supply of the current, the voltage Vout of the output node No may decrease from the sensing reference voltage Vsen_ref over time.

During the first tracking period Tt_1, the first scanning signal SCAN1 of the turn-on level may be supplied to the first scanning transistor SCT1. In other words, the first scanning transistor SCT1 may be switched to the turn-on state. In accordance therewith, according to a voltage charged in the first storage capacitor Cst1, a sensing current may flow to the charging ratio sensing unit 600. The sensing current may be supplied to the inverting terminal− of the operational amplifier Amp. In accordance with supply of the sensing current to the charging ratio sensing unit 600, the voltage level of the voltage Vout of the output node No may decrease from the sensing reference voltage Vsen_ref over time.

Referring to FIG. 8, the magnitude of the voltage Vout of the output node No is the same as that of the sensing reference voltage Vsen_ref at the 13th time point t13, and thereafter the magnitude of the voltage Vout of the output node No decreases. Thereafter, at a 15th time point t15 included in the sampling period Ts, the voltage Vout of the output node No may be a first sensing value Vsen1.

The first sampling period Ts_1 may be a period from the 14th time point t14 to the 15th time point t15.

The first sampling period Ts_1 may be a period in which a voltage tracked by the charging ratio sensing unit 600 is sampled.

The first sampling period Ts_1 may be a period in which the voltage Vout of the output node No is sampled.

During the first sampling period Ts_1, the first scanning signal SCAN1 of the turn-on level may be supplied. In other words, the first scanning transistor SCT1 may be in the turn-on state.

During the first sampling period Ts_1, the sampling signal Sampling may be at the turn-on level. When the sampling signal Sampling is at the turn-on level, a sampling circuit (not illustrated) may sample the voltage Vout of the output node No. Referring to FIG. 8, the voltage Vout of the output node No that is sampled may be the first sensing value Vsen1 of the 15th time point t15. Thereafter, the display device 100 may derive a charging ratio C_ratio of the storage capacitor Cst on the basis of the first sensing value Vsen1.

Referring to FIG. 8, the k-th subpixel charging ratio sensing period Tspk may be a period in which the charging ratio C_ratio of the k-th storage capacitor Cstk included in the k-th subpixel SPk is sensed.

The k-th subpixel charging ratio sensing period Tspk may be a period in which the k-th subpixel SPk electrically connected to the k-th gate line GLk is sensed. K is a natural number equal to or greater than 2. For example, when k is 2, the second subpixel charging ratio sensing period Tsp2 may be a period in which the second subpixel SP2 electrically connected to the second gate line GL2 is sensed.

The k-th subpixel SPk may has the same subpixel structure as the first subpixel SP1. The k-th subpixel SPk may include a k-th light emitting element EDk, a k-th driving transistor DRTk, a k-th scanning transistor SCTk, a k-th storage capacitor Cstk, and a k-th switch SWk.

The k-th subpixel charging ratio sensing period Tspk may include a k-th charging period Tc_k, a k-th initialization period Ti_k, a k-th tracking period Tt_k, and a k-th sampling period Ts_k.

The k-th charging period Tc_k may be a period from an k1-th time point tk1 to a k2-th time point tk2.

The k-th charging period Tc_k may be a period in which the storage capacitor Cst included in the subpixel SP is charged with a predetermined voltage.

During the k-th charging period Tc_k, a scanning signal SCAN may be supplied to the subpixel SP. For example, a k-th scanning signal SCANk may be supplied to the k-th subpixel SPk, and, in accordance therewith, the k-th scanning transistor SCTk may be switched to the turn-on state. At this time, the turn-on signal is supplied also to the k-th switch SWk, the reference voltage Vref may be supplied to the second node Nk2, and the turn-on signal supplied to the k-th switch SWk may be the k-th scanning signal SCANk. In other words, during the k-th charging period Tc_k, both ends of the k-th storage capacitor Cstk may be in a state in which a voltage may be supplied thereto.

During the k-th charging period Tc_k, a predetermined voltage may be supplied to both the ends of the storage capacitor Cst. For example, a data voltage Vdata may be supplied to a first node Nk1 to which the k-th storage capacitor Cstk is connected, and a reference voltage Vref may be supplied to a second node Nk2 to which the k-th storage capacitor Cstk is connected. In accordance therewith, the k-th storage capacitor Cstk may be charged with a voltage value corresponding to a voltage difference between both ends thereof.

During the k-th charging period Tc_k, a data voltage Vdata for displaying a single-color pattern (Solid Pattern) video may be supplied. Differently from the description presented above, during the k-th charging period Tc_k, a data voltage Vdata for displaying a one-by-one pattern video may be supplied as well. In other words, during the k-th charging period Tc_k, a data voltage Vdata for displaying a video of any one of various patterns may be supplied.

A first data voltage Vdata1 supplied to the data line DL in a charging period Tc_1 included in a first subpixel charging ratio sensing period Tsp1 for displaying a single-color pattern video solid pattern may be the same as a second data voltage Vdata2 supplied to the data line DL in a charging period Tc_2 included in a second subpixel charging ratio sensing period Tsp2.

A magnitude of a first data voltage Vdata1 supplied to the data line DL in the charging period Tc_1 included in the first subpixel charging ratio sensing period Tsp1 for displaying a one-by-one pattern video may be different from that of a second data voltage Vdata2 supplied to the data line DL in the charging period Tc_2 included in the second subpixel charging ratio sensing period Tsp2.

A process in which a voltage is supplied to both ends of the storage capacitor Cst during the k-th charging period Tc_k may be the same as a process for displaying a frame video on the display panel 110 during the frame video period Td. In accordance with the processes being the same, the charging ratio C_ratio of the storage capacitor Cst of the frame video period Td may be also sensed through the process of sensing the pixel charging ratio.

The k-th charging period Tc_k may advance for a predetermined period. For example, the k-th charging period may advance for a 1H period but is not limited thereto.

The k-th initialization period Ti_k may be a period from a k2-th time point tk2 to a k3-th time point tk3.

The k-th initialization period Ti_k may be a period in which the charging ratio sensing unit 600 is initialized.

During the k-th initialization period Ti_k, an initialization signal Initial of the turn-on level may be supplied to the initialization switch SW. In accordance with supply of the initialization signal Initial of the turn-on level, the initialization switch SW may electrically connect the output node No and the inverting node Nn to each other.

Since a sensing reference voltage Vsen_ref may be supplied to the non-inverting terminal+ of the operational amplifier Amp, the sensing reference voltage Vsen_ref may be formed also in the inverting terminal− of the operational amplifier Amp. Since the output node No and the inverting node Nn are in an electrically-connected state, the sensing reference voltage Vsen_ref may be supplied to the output node No. In accordance therewith, the voltage Vout of the output node No may be the sensing reference voltage Vsen_ref. In other words, the k-th initialization period Ti_k may be a period in which the voltage Vout of the output node No becomes the sensing reference voltage Vsen_ref.

The k-th tracking period Tt-k may be a period from a k3-th time point tk3 to a k4-th time point tk4.

The k-th tracking period Tt-k may be a period in which a predetermined voltage charged in the k-th storage capacitor Cstk is tracked by the charging ratio sensing unit 600.

The k-th tracking period Tt-k may be a period in which the voltage Vout of the output node No is tracked by the voltage of the k-th storage capacitor Cstk.

During the k-th tracking period Tt_k, an initialization signal Initial of the turn-off level may be supplied to the initialization switch SW. In accordance therewith, the output node No and the inverting node Nn may be in a state not being electrically connected to each other. At this time, the charging ratio sensing unit 600 may be configured using an integrator circuit. The charging ratio sensing unit 600 may be supplied with a current through the inverting terminal− of the operational amplifier Amp, and, in accordance with supply of the current, the voltage Vout of the output node No may decrease from the sensing reference voltage Vsen_ref over time.

During the k-th tracking period Tt_k, the k-th scanning signal SCANk of the turn-on level may be supplied to the k-th scanning transistor SCTk. In other words, the k-th scanning transistor SCTk may be switched to the turn-on state. In accordance with the k-th scanning transistor SCTk being in the turn-on state, a sensing current may flow to the charging ratio sensing unit 600 in accordance with a voltage charged in the k-th storage capacitor Cstk. The sensing current may be supplied to the inverting terminal− of the operational amplifier Amp. In accordance with supply of the sensing current to the charging ratio sensing unit 600, the voltage level of the voltage Vout of the output node No may decrease from the sensing reference voltage Vsen_ref over time.

Referring to FIG. 8, the magnitude of the voltage Vout of the output node No is the same as that of the sensing reference voltage Vsen_ref at the k3-th time point tk3, and thereafter the magnitude of the voltage Vout of the output node No decreases. Thereafter, at a k5-th time point tk5 included in the sampling period Ts, the voltage Vout of the output node No may be a first sensing value Vsenk.

The k-th sampling period Ts_k may be a period from the k4-th time point tk4 to the k5-th time point tk5.

The k-th sampling period Ts_k may be a period in which a voltage tracked by the charging ratio sensing unit 600 is sampled.

The k-th sampling period Ts_k may be a period in which the voltage Vout of the output node No is sampled.

During the k-th sampling period Ts_k, the k-th scanning signal SCANk of the turn-on level may be supplied. In other words, the k-th scanning transistor SCTk may be in the turn-on state.

During the k-th sampling period Ts_k, the sampling signal Sampling may be at the turn-on level. When the sampling signal Sampling is at the turn-on level, a sampling circuit (not illustrated) may sample the voltage Vout of the output node No. Referring to FIG. 8, the voltage Vout of the output node No that is sampled may be the k-th sensing value Vsenk of the k5-th time point tk5. Thereafter, the display device 100 may derive a charging ratio C_ratio of the storage capacitor Cst on the basis of the k-th sensing value Vsenk.

Due to a difference between charging ratios C_ratio of storage capacitors Cst, the magnitude of a voltage Vsen1 sampled in a first sampling period Ts1 included in the first subpixel charging ratio sensing period Tsp1 may be different from that of a voltage Vsen2 sampled in a second sampling period Ts_2 included in the second subpixel charging ratio sensing period Tsp2. Referring to FIG. 8, the magnitude of the voltage Vsen1 sampled in the first sampling period Ts1 included in the first subpixel charging ratio sensing period Tsp1 may be different from that of a voltage Vsenk sampled in a k-th sampling period Ts_k included in the k-th subpixel charging ratio sensing period Tspk.

FIGS. 9 to 13 are diagrams for describing a process of deriving a charging ratio change value C_ratio' according to aspects of the present disclosure.

Multiple subpixels SP may be disposed in the display panel 910, and each of the multiple subpixels SP may include a storage capacitor Cst.

Figure 9:
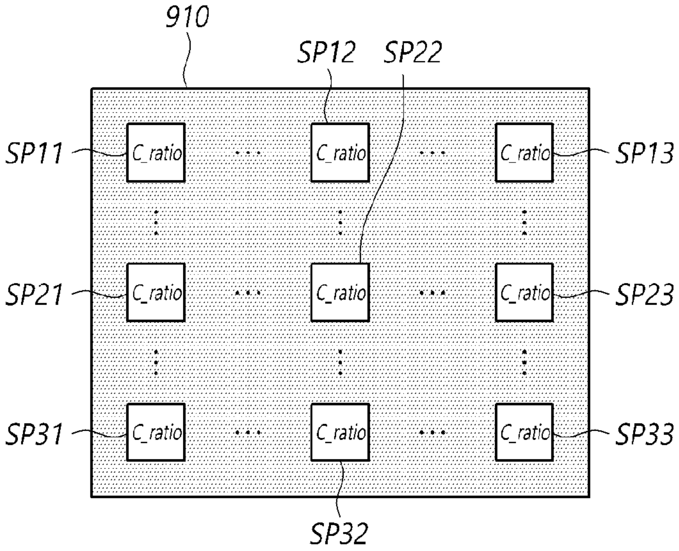
FIGS. 9 to 13 are diagrams for describing a process of deriving a charging ratio change value according to aspects of the present disclosure.

Referring to FIG. 9, the display panel 910 may include multiple subpixels SP, and, for the convenience of description, only an 11th subpixel SP11 to a 33rd subpixel SP33 among the multiple subpixels SP are illustrated in FIG. 9.

The 11th subpixel SP11 may be a subpixel SP disposed in an uppermost row in a leftmost column of the display panel 910.

The 21st subpixel SP21 may be a subpixel SP disposed at the center in a leftmost column of the display panel 910.

The 31st subpixel SP31 may be a subpixel SP disposed in a lowermost row in the leftmost column of the display panel 910.

The 12th subpixel SP12 may be a subpixel SP disposed in an uppermost row in the center column of the display panel 910.

The 22nd subpixel SP22 may be a subpixel SP disposed at the center in a center column of the display panel 910.

The 32nd subpixel SP32 may be a subpixel SP disposed in a lowermost row in the center column of the display panel 910.

The 13th subpixel SP13 may be a subpixel SP disposed in the uppermost row in a rightmost column of the display panel 910.

The 23rd subpixel SP23 may be a subpixel SP disposed at the center in the rightmost column of the display panel 910.

The 33rd subpixel SP33 may be a subpixel SP disposed in the lowermost row in the rightmost column of the display panel 910.

Referring to FIG. 9, each of the multiple subpixels SP may include a storage capacitor Cst, and a voltage charged in the storage capacitor Cst may be represented as a charging ratio C_ratio. The charging ratio C_ratio of the storage capacitor Cst may be a value acquired by comparing a voltage between both ends of the storage capacitor Cst of which the charging ratio is the highest and a voltage between both the ends of the storage capacitor Cst that is a measurement target with each other.

For example, a charging speed of the storage capacitor Cst of the 11th subpixel SP11 may be the highest among the multiple subpixels SP, and a charging ratio C_ratio may be derived using an 11th charged voltage charged in the storage capacitor Cst of the 11th subpixel SP11 as a reference for charging comparison. In such a case, the charging ratio C_ratio of the storage capacitor Cst of the 11th subpixel SP11 may be represented as 100. On the other hand, a charging speed of the storage capacitor Cst of the 32nd subpixel SP32 may be the lowest among the multiple subpixels SP, and a charging ratio C_ratio of the storage capacitor Cst of the multiple subpixels SP may be represented as a value equal to or smaller than 100.

Figure 10:
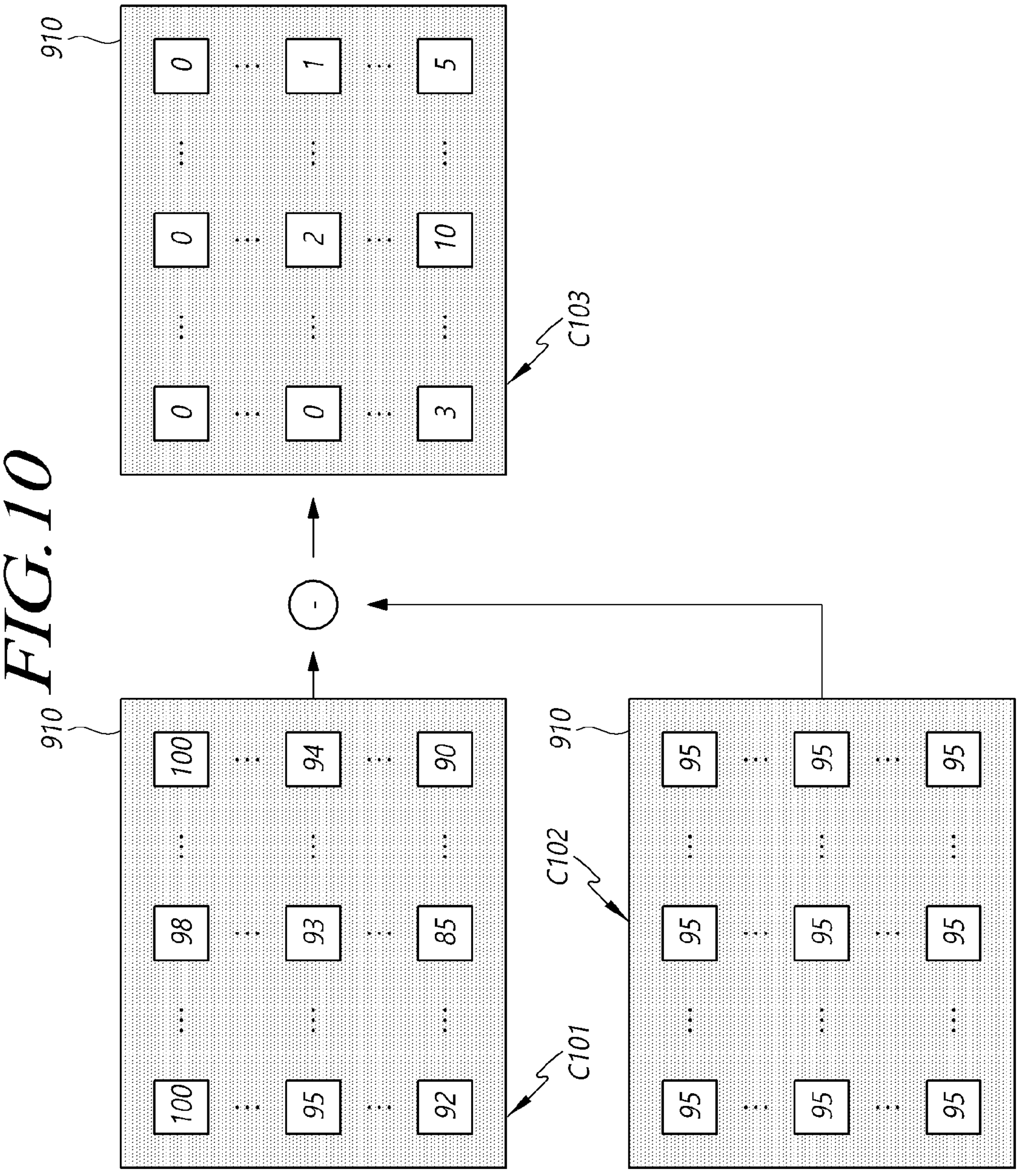

Referring to FIG. 10, charging ratio results C101 for a single-color pattern may be checked. After a data voltage Vdata for displaying a single-color pattern video solid pattern is supplied to the multiple subpixels SP, charging ratios C_ratio of the storage capacitors Cst of the multiple subpixels SP may be derived. In other words, the charging ratio results C101 for the single-color pattern may include the charging ratios C_ratio of the storage capacitors Cst of the multiple subpixels SP. For example, the charging ratios C_ratio of the storage capacitors of the 11th subpixel SP11 to the 31st subpixel SP31 may be respectively 100, 98, and 100. The charging ratios C_ratio of the storage capacitors of the 12th subpixel SP12 to the 32nd subpixel SP32 may be respectively 95, 93, and 94. The charging ratios C_ratio of the storage capacitors of the 13th subpixel SP13 to the 33rd subpixel SP33 may be respectively 92, 85, and 90.

Referring to FIG. 10, charging ratio results C102 for a charging ratio threshold may be checked. In this case, all the charging ratios C_ratio of the storage capacitors of the multiple subpixels SP may be set to 95. The charging ratio threshold Threshold may represent a minimal storage capacitor charging ratio C_ratio used for displaying a normal frame video on the display panel 110. This charging ratio threshold may be 100 and is assumed to be 95 in FIG. 10, and the charging ratio threshold Threshold may be variously designed in some cases.

Referring to FIG. 10, a charging ratio change value C103 according to a position may be derived by subtracting the charging ratio results C102 for the charging ratio threshold Threshold from the charging ratio results C101 for a single-color pattern.

Referring to FIG. 10, charging ratio change values C103 according to positions may have the following values. The charging ratio change values C_ratio' of the storage capacitors of the 11th subpixel SP11 to the 31st subpixel SP31 may be respectively 0, 0, and 0. The charging ratio change values C_ratio' of the storage capacitors of the 12th subpixel SP12 to the 32nd subpixel SP32 may be respectively 0, 2, and 1. The charging ratio change values C_ratio' of the storage capacitors of the 13th subpixel SP13 to the 33rd subpixel SP33 may be respectively 3, 10, and 5.

By using the charging ratio change values C103 according to positions described above, voltage gain ratios a corresponding to the charging ratio change values C103 according to positions are calculated, whereby a first lookup table LUT1 may be generated.

Although the display panel 110 illustrated in FIG. 3 may have a "pixel charging ratio decrease according to a position" problem, the charging ratio C_ratio of the storage capacitor Cst may be improved by applying the first lookup table LUT1 to a subpixel SP corresponding to a corresponding charging ratio change value C_ratio'. In other words, in accordance with supply of the changed data voltage Vdata' acquired by applying the voltage gain ratio a to the data voltage Vdata to the subpixel SP, the charging ratio C_ratio of the storage capacitor Cst may be improved.

Figure 11:
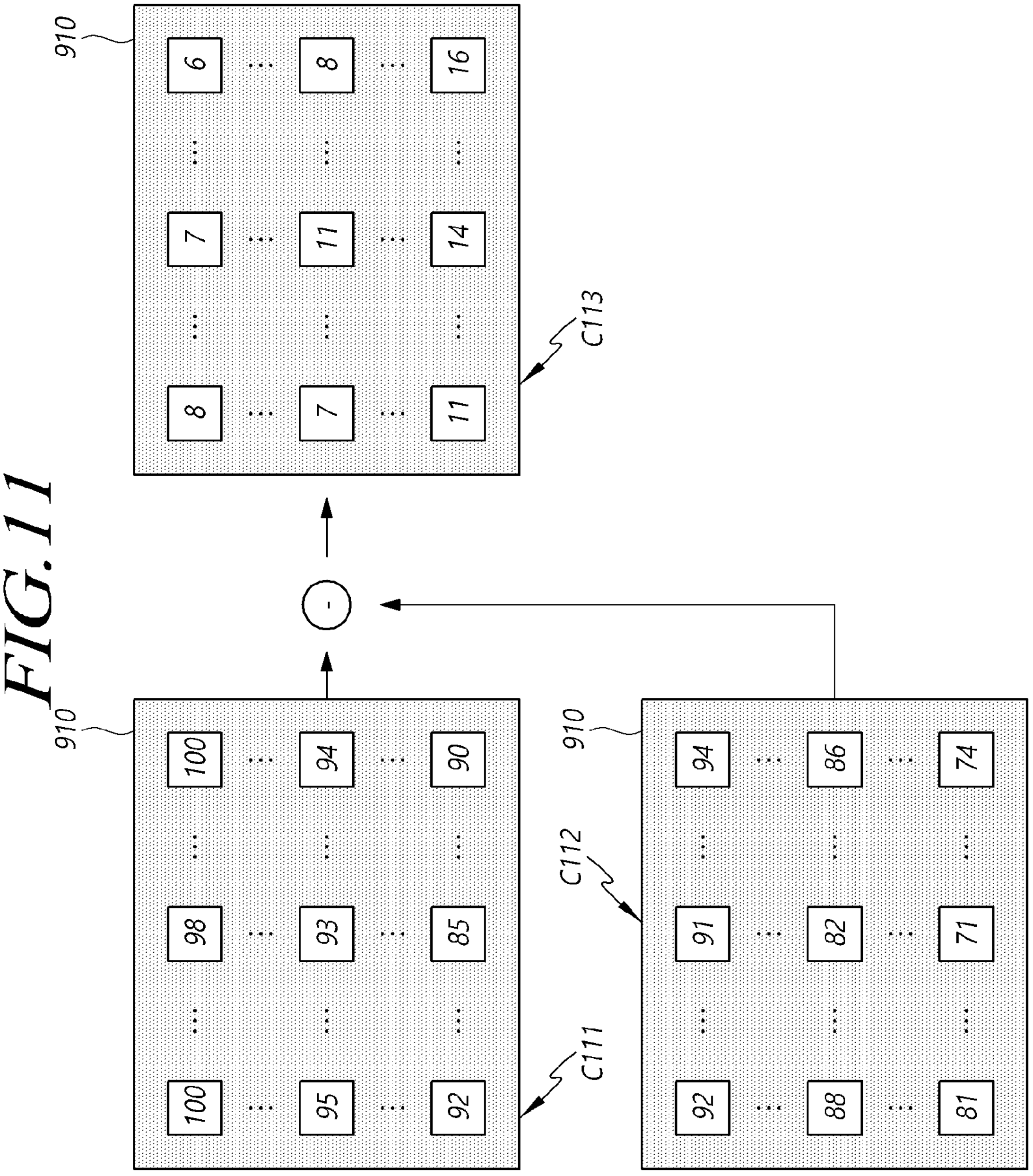

Referring to FIG. 11, charging ratio results C111 for a single-color pattern may be checked. This may be the same as the charging ratio results C101 for the single-color pattern illustrated in FIG. 10.

Referring to FIG. 11, charging ratio results C112 for a one-by-one pattern may be checked. After data voltages Vdata for displaying a one-by-one pattern video are supplied to multiple subpixels SP, the charging ratios C_ratio of the storage capacitors Cst of the multiple subpixels SP may be derived. In other words, the charging ratio results C112 for a one-by-one pattern may include charging ratios C_ratio of the storage capacitors Cst of the multiple subpixels SP. For example, the charging ratios C_ratio of the storage capacitors of the 11th subpixel SP11 to the 31st subpixel SP31 may be respectively 92, 91, and 94. The charging ratios C_ratio of the storage capacitors of the 12th subpixel SP12 to the 32nd subpixel SP32 may be respectively 88, 82, and 86. The charging ratios C_ratio of the storage capacitors of the 13th subpixel SP13 to the 33rd subpixel SP33 may be respectively 81, 71, and 74.

Referring to FIG. 11, by subtracting the charging ratio results C112 for the one-by-one pattern from the charging ratio results C111 for the single-color pattern, charging ratio change values C113 according to data may be derived.

Referring to FIG. 11, the charging ratio change values C113 according to data may have the following values. The charging ratio change values C_ratio' of the storage capacitors of the 11th subpixel SP11 to the 31st subpixel SP31 may be respectively 8, 7, and 6. The charging ratio change values C_ratio' of the storage capacitors of the 12th subpixel SP12 to the 32nd subpixel SP32 may be respectively 7, 11, and 8. The charging ratio change values C_ratio' of the storage capacitors of the 13th subpixel SP13 to the 33rd subpixel SP33 may be respectively 11, 14, and 16.

By using the charging ratio change values C113 according to data described above, voltage gain ratios a corresponding to the charging ratio change values C113 according to data are calculated, whereby a second lookup table LUT2 may be generated.

Although the display panel 110 illustrated in FIG. 4 may have a "pixel charging ratio decrease according to a pattern" problem, the charging ratio C_ratio of the storage capacitor Cst may be improved by applying the second lookup table LUT2 to a subpixel SP corresponding to a corresponding charging ratio change value C_ratio'. In other words, in accordance with supply of the changed data voltage Vdata' acquired by applying the voltage gain ratio a to the data voltage Vdata to the subpixel SP, the charging ratio C_ratio of the storage capacitor Cst may be improved.

Figure 12:
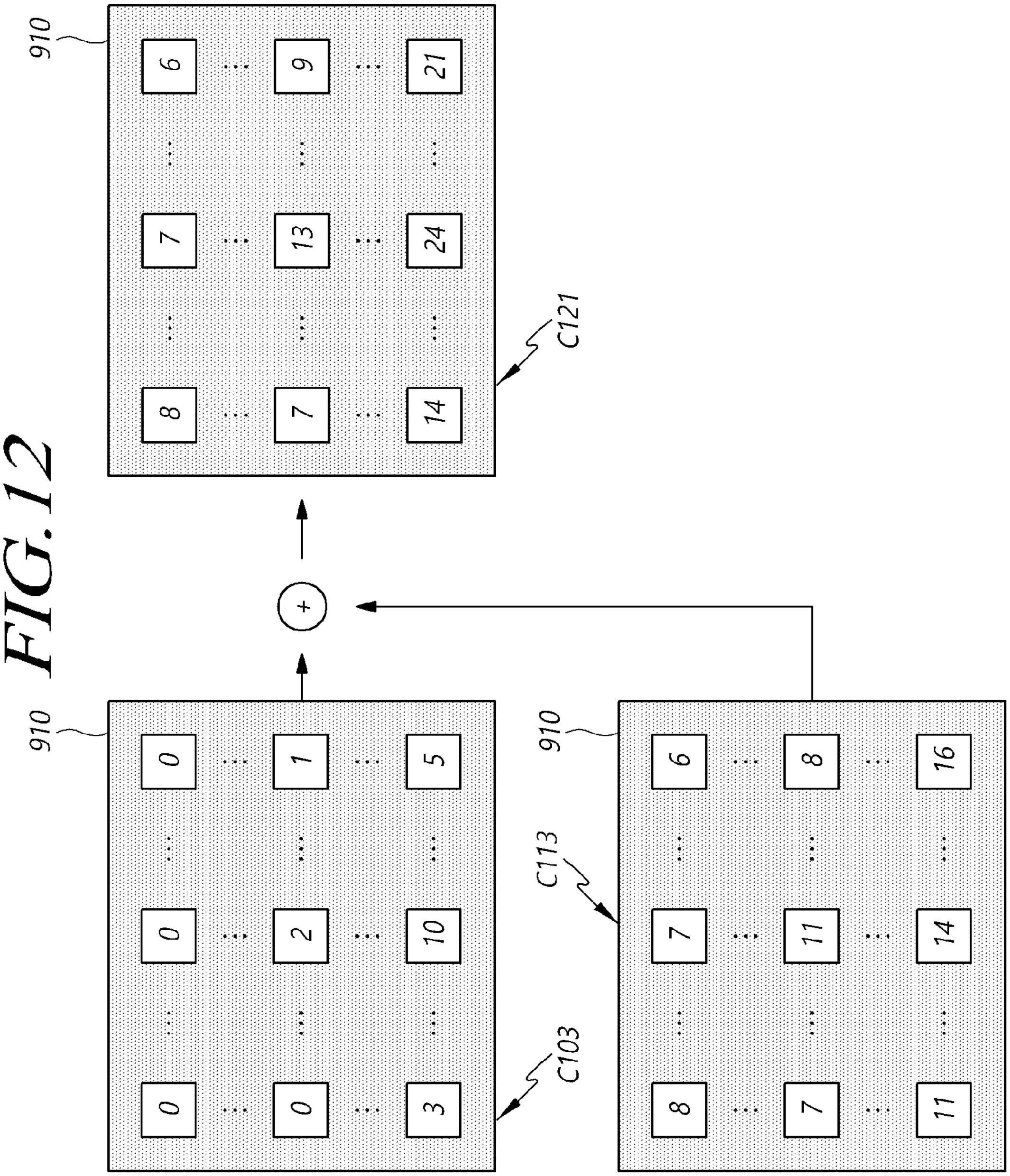

Referring to FIG. 12, by adding charging ratio change values C113 according to data to charging ratio change values C103 according to positions, integrated charging ratio change values C121 may be derived.

Referring to FIG. 12, the integrated charging ratio change values C121 may have the following values. The charging ratio change values C_ratio' of the storage capacitors of the 11th subpixel SP11 to the 31st subpixel SP31 may be respectively 8, 7, and 6. The charging ratio change values C_ratio' of the storage capacitors of the 12th subpixel SP12 to the 32nd subpixel SP32 may be respectively 7, 13, and 9. The charging ratio change values C_ratio' of the storage capacitors of the 13rd subpixel SP13 to the 33rd subpixel SP33 may be respectively 14, 24, and 21.

Figure 13:
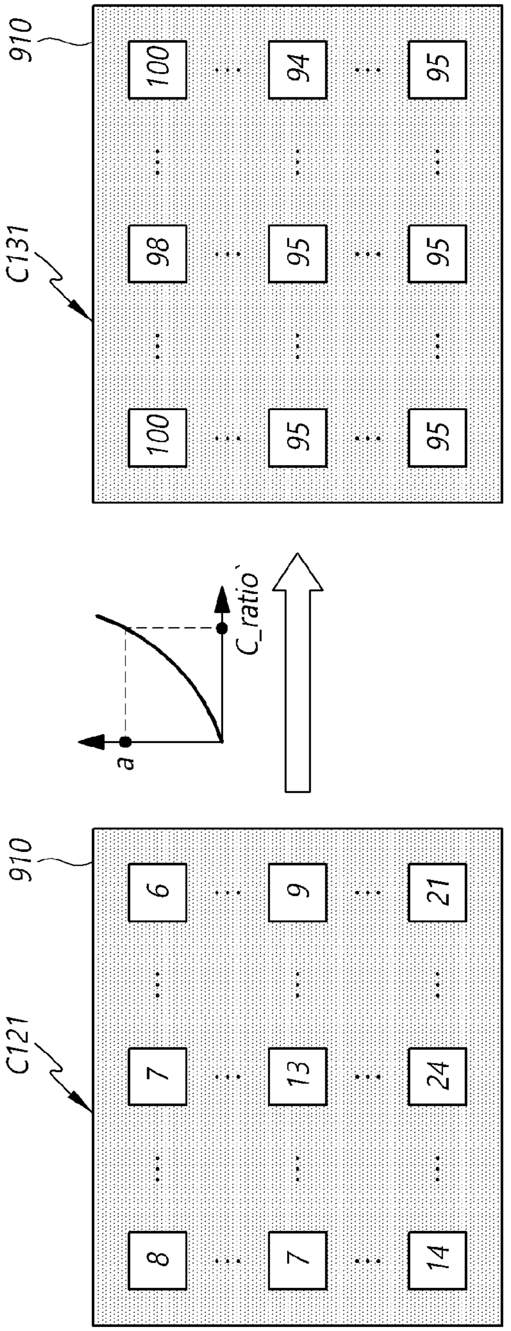

Referring to FIG. 13, by calculating voltage gain ratios a corresponding to the integrated charging ratio change values C121, a third lookup table LUT3 may be generated. In a case in which the third lookup table LUT3 described above is applied to a subpixel SP corresponding to a corresponding charging ratio change value C_ratio', the charging ratio C_ratio of the storage capacitor Cst may be improved.

Referring to FIG. 13, the improved charging ratio results C131 may be checked. The improved charging ratio results C131 may have the following values. The charging ratio change values C_ratio of the storage capacitors of the 11th subpixel SP11 to the 31st subpixel SP31 may be respectively 100, 98, 100. The charging ratio change values C_ratio of the storage capacitors of the 12th subpixel SP12 to the 32nd subpixel SP32 may be respectively 95, 95, and 94. The charging ratio change values C_ratio of the storage capacitors of the 13rd subpixel SP13 to the 33rd subpixel SP33 may be respectively 95, 95, and 95.

In other words, in accordance with supply of a changed data voltage Vdata' acquired by applying a voltage gain ratio a to the data voltage Vdata to the subpixel SP, the charging ratio C_ratio of the storage capacitor Cst may be improved.

Figure 14:
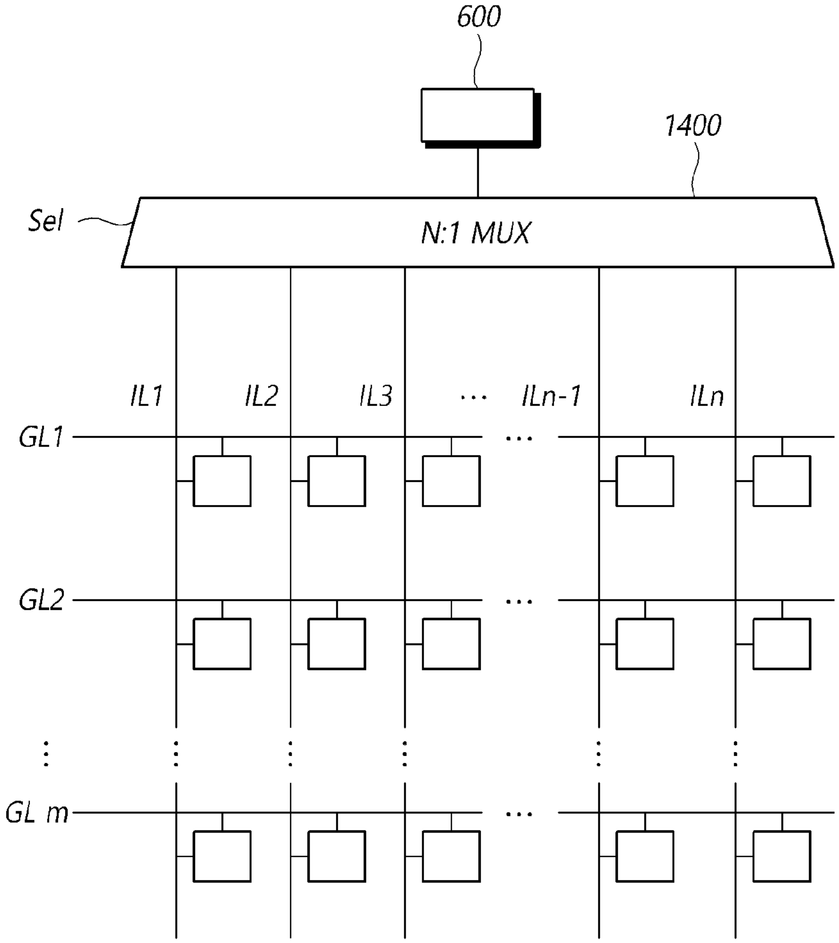
FIG. 14 is an equivalent circuit diagram of a charging ratio sensing unit, a MUX circuit, and multiple subpixels according to aspects of the present disclosure.

FIG. 14 is an equivalent circuit diagram of a charging ratio sensing unit 600, a MUX circuit 1400, and multiple subpixels SP according to aspects of the present disclosure.

The MUX circuit 1400 may include an input terminal and multiple output terminals. The MUX circuit 1400 may select one output terminal among the multiple output terminals by receiving supply of an output line selection signal Sel.

Referring to FIG. 14, the charging ratio sensing unit 600 may be electrically connected to the input terminal of the MUX circuit 1400. The charging ratio sensing unit 600 illustrated in FIG. 14 may be the same as the charging ratio sensing unit 600 illustrated in FIG. 6.

Referring to FIG. 14, output terminals of the MUX circuit 1400 may be electrically connected to the multiple input lines IL. For example, a first input line IL1 may be electrically connected to a first output terminal of the MUX circuit 1400, and a second input line IL2 may be electrically connected to a second output terminal of the MUX circuit 1400.

Referring to FIG. 14, the MUX circuit 1400 may select only the first input line IL1 by receiving supply of the output line selection signal Sel. Thereafter, the charging ratios C_ratio of storage capacitors Cst included in subpixels SP electrically connected to the first input line IL1 may be sequentially sensed.

Referring to FIG. 14, after the charging ratios C_ratio of the storage capacitors Cst are sequentially sensed by selecting the first input line IL1, the MUX circuit 1400 may select only the second input line IL2 by receiving supply of the output line selection signal Sel. Thereafter, the charging ratios C_ratio of storage capacitors Cst included in subpixels SP electrically connected to the second input line IL2 may be sequentially sensed.

Referring to FIG. 14, after the charging ratios C_ratio of the storage capacitors Cst are sequentially sensed by selecting the second input line IL2, the process described above may repeatedly performed. The MUX circuit 1400 may select only an n-th input line ILn by receiving supply of the output line selection signal Sel. Thereafter, the charging ratios C_ratio of the storage capacitors Cst included in subpixels SP electrically connected to the n-th input line ILn may be sequentially sensed.

As described above, the MUX circuit 1400 may sequentially select the first input line IL1 to the n-th input line ILn in accordance with the output line selection signal Sel. An order in which the input lines IL are selected from the left side to the right side is merely one example, and an order in which the multiple input lines ILn are selected may be random. In other words, there is no restriction on the method for selecting the input lines IL.

The charging ratio sensing unit 600 may be disposed for each of n input lines IL, and the n charging ratio sensing units 600 may be simultaneously driven. For example, the charging ratio sensing unit 600 may include n charging ratio sensing units 600 such as a first charging ratio sensing unit 600_1 electrically connected to the first input line IL1, a second charging ratio sensing unit 600_2 electrically connected to the second input line IL2, and the like.

However, referring to FIG. 14, by decreasing n charging ratio sensing units 600 to one charging ratio sensing unit 600 by using the MUX circuit 1400, the size of the display device 100 may be decreased.

On the other hand, when there are n input lines IL, the number of MUX circuits 1400 may be variously designed. In a case in which the MUX circuit 1400 includes k output terminals, the MUX circuit 1400 may be referred to as a "K: 1 MUX circuit". Hereinafter, for the convenience of description, a subpixel SP disposed in an a-th row and a b-th column may be referred to as an "ab-th subpixel SPab."

Referring to FIG. 14, the MUX circuit 1400 may be configured as an N:1 MUX circuit, and there may be one MUX circuit 1400. In such a case, the MUX circuit 1400 may be driven using various methods.

A first example of the method for driving the N: 1 MUX circuit is as follows. The MUX circuit 1400 may have one subpixel SP among multiple subpixels SP set as a sensing target and sense each of charging ratios C_ratio of storage capacitors Cst of all the subpixels SP. In such a case, the charging ratios C_ratio of all the storage capacitors Cst may be accurately sensed.

A second example of the method for driving the N: 1 MUX circuit is as follows. In first sensing, the MUX circuit 1400 may set one subpixel SP among multiple subpixels SP as a sensing target. Then, a charging ratio C_ratio of a storage capacitor Cst included in this subpixel SP may be sensed. For example, a charging ratio C_ratio of the storage capacitor Cst included in the 11th subpixel SP11 may be sensed. Thereafter, in second sensing, the MUX circuit 1400 may sense a charging ratio C_ratio of the storage capacitor Cst included in the 13th subpixel SP13. Although a charging ratio C_ratio of the storage capacitor Cst included in the 12th subpixel SP12 has not been sensed, the charging ratio C_ratio of the storage capacitor Cst included in the 12th subpixel SP12 may be estimated using charging ratios C_ratio of storage capacitors Cst included in subpixels SP adjacent thereto. The adjacent subpixels SP may be subpixels SP that are adjacent to the 12th subpixel SP12 on upper, lower, left, and right sides. In a case in which the method described above is used, the N: 1 MUX circuit selects and senses only n/2 input lines IL without selecting all the n input lines IL, a sensing time may be decreased.

In the second example of the method for driving the N:1 MUX circuit, an operation method in which the 11th subpixel SP11 is selected, and the 13th subpixel SP13 is selected has been described. In other words, an example in which n/2 input lines IL are selected as sensing targets by selecting only odd-numbered subpixels SP has been described. However, the operation method is not limited is not limited thereto, and thus n/3 input lines IL may be selected, or fewer input lines IL may be selected. In other words, there is no restriction on the number of some input lines IL selected from among n input lines IL.

A third example of the method for driving the N: 1 MUX circuit is as follows. In the second example, some input lines IL among n input lines IL are described to be selected. When the number of n input lines IL is assumed to be 100, some input lines IL may be a 1st input line IL1, a 25th input line IL25, a 50th input line IL50, a 75th input line IL75, and a 100th input line IL100. In such a case, a state in which charging ratios C_ratio of storage capacitors Cst included in the some subpixels SP have been sensed is formed. Although charging ratios C_ratio of storage capacitors Cst of the remaining subpixels SP have not been sensed, the charging ratios C_ratio of the storage capacitors Cst may be estimated through an interpolation method. Referring to FIGS. 3 and 4, the charging ratio C_ratio of a storage capacitor Cst may be estimated in accordance with a position at which the storage capacitor is disposed in the display panel 110. In other words, by selecting and sensing only some input lines IL, the sensing time may be decreased, and, by estimating the charging ratios C_ratio of the remaining storage capacitors Cst through an interpolation method, the pixel charging ratio may be efficiently improved.

Meanwhile, although not illustrated in FIG. 14, the MUX circuit 1400 may be configured using not one N:1 MUX circuit but multiple MUX circuits 1400. In a case in which the MUX circuit 1400 is configured using not one MUX circuit but multiple MUX circuits, the multiple MUX circuits 1400 may be variously configured such as a 2:1 MUX circuit, a 3:1 MUX circuit, and a 4:1 MUX circuit. A driving method used in a case in which the MUX circuit 1400 is configured using multiple MUX circuits will be described.

For example, in a case in which the number of input lines IL is 100, there may be 50 2:1 MUX circuits. The 2:1 MUX circuit may be electrically connected to two subpixels SP. The 2:1 MUX circuit may select subpixel SP disposed on the left side of two subpixels SP as a sensing target. A charging ratio C_ratio of a storage capacitor Cst included in this subpixel SP may be sensed. Thereafter, the subpixel SP disposed on the right side is not sensed, and the charging ratio C_ratio of a storage capacitor Cst included in the right subpixel SP may be estimated using the charging ratio C_ratio of the storage capacitor Cst included in the left subpixel SP.

As another example, the 3:1 MUX circuit may be electrically connected to three subpixels SP. Also in this case, similar to the 2:1 MUX circuit, by selecting only one subpixel SP among the three subpixels SP as a sensing target, a charging ratio C_ratio of a storage capacitor Cst included in this subpixel SP may be sensed. Thereafter, the charging ratios C_ratio of storage capacitors Cst included in the remaining subpixels SP may be estimated using the charging ratio C_ratio of the storage capacitor Cst included in the subpixel SP that is the sensing target. This similarly applies also to a configuration using a 4:1 MUX circuit, a 5:1 MUX circuit, or the like.

Figure 15:
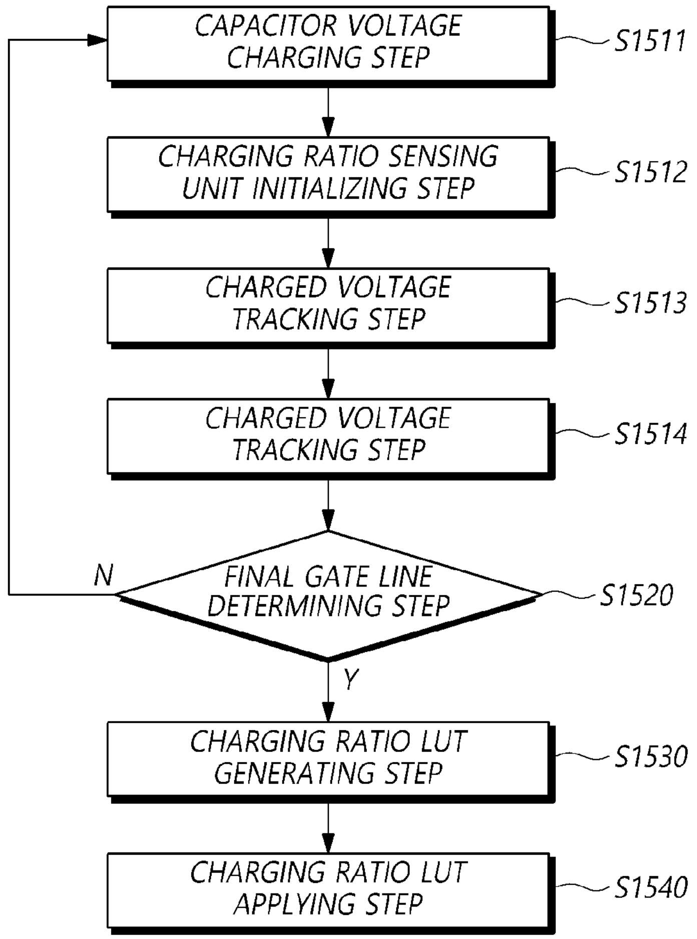
FIG. 15 is a flowchart of pixel charging ratio sensing driving of a display device according to aspects of the present disclosure.

FIG. 15 is a flowchart of pixel charging ratio sensing driving of the display device 100 according to aspects of the present disclosure.

Steps for pixel charging ratio sensing driving of the display device 100 include a capacitor voltage charging step S1511, a charging ratio sensing unit initializing step S1512, a charged voltage tracking step S1513, a charged voltage sampling step S1514, a final gate line determining step S1520, a charging ratio LUT generating step S1530, and a charging ratio LUT applying step S1540.

The capacitor voltage charging step S1511 may be a period in which the storage capacitor Cst included in the subpixel SP is charged with a predetermined voltage.

In the capacitor voltage charging step S1511, a data voltage Vdata may be supplied to a gate node of the driving transistor DRT, and a reference voltage Vref may be supplied to a source node of the driving transistor DRT. In accordance therewith, both ends of the storage capacitor Cst included in the subpixel SP may be charged with a predetermined voltage. A time for charging with a predetermined voltage may be 1H. A level of the voltage charged in the storage capacitor Cst may be represented using a charging ratio C_ratio. The charging ratio C_ratio of the storage capacitor Cst may be different in accordance with a position at which the storage capacitor Cst is disposed in the display panel 110. In addition, the charging ratio C_ratio of the storage capacitor Cst may be different in accordance with a magnitude change of the data voltage Vdata supplied to the storage capacitor Cst.

In the capacitor voltage charging step S1511, a data voltage Vdata for displaying a single-color pattern (solid pattern) video may be supplied, or a data voltage Vdata for displaying a one-by-one pattern video may be supplied. In other words, in the capacitor voltage charging step S1511, a data voltage Vdata for displaying a video of any one of various patterns may be supplied.

261] To display a single-color pattern (solid pattern) video, a first data voltage Vdata1 supplied to the data line DL in a capacitor voltage charging step S1511_1 included in a first subpixel charging ratio sensing step S1510_1 may be the same as a second data voltage Vdata2 supplied to the data line DL in a capacitor voltage charging step S1511_2 included in the second subpixel charging ratio sensing step S1510_2.

262] To display a one-by-one pattern video, a magnitude of a first data voltage Vdata1 supplied to the data line DL in a capacitor voltage charging step S15111 included in the first subpixel charging ratio sensing step S1510_1 may be different from that of a second data voltage Vdata2 supplied to the data line DL in a capacitor voltage charging step S1511_2 included in the second subpixel charging ratio sensing step S1510_2.

The charging ratio sensing unit initializing step S1512 may be a step in which the charging ratio sensing unit 600 electrically connected to the subpixel SP is initialized.

In the charging ratio sensing unit initializing step S1512, the initialization signal Initial of the turn-on level may be supplied to the initialization switch SW. In accordance with supply of the initialization signal Initial of the turn-on level, the initialization switch SW may electrically connect the output node No and the inverting node Nn to each other. Since a sensing reference voltage Vsen_ref may be supplied to the non-inverting terminal+ of the operational amplifier Amp, the sensing reference voltage Vsen_ref may be formed also in the inverting terminal− of the operational amplifier Amp. Since the output node No and the inverting node Nn are in an electrically-connected state, the sensing reference voltage Vsen_ref may be supplied to the output node No. In accordance therewith, the voltage Vout of the output node No may be the sensing reference voltage Vsen_ref.

The charged voltage tracking step S1513 may be a step in which the voltage Vout of the output node No is tracked by the voltage of the storage capacitor Cst.

The charged voltage tracking step S1513 may be a step in which a predetermined voltage charged in the storage capacitor Cst is tracked by the charging ratio sensing unit 600.

In the charged voltage tracking step S1513, the initialization signal Initial of the turn-off level may be supplied to the initialization switch SW. In accordance therewith, the output node No and the inverting node Nn may be in a state not being electrically connected to each other. At this time, the charging ratio sensing unit 600 may be configured using an integrator circuit. The charging ratio sensing unit 600 may be supplied with a current through the inverting terminal− of the operational amplifier Amp, and, in accordance with supply of the current, the voltage Vout of the output node No may decrease from the sensing reference voltage Vsen_ref over time.

In the charged voltage tracking step S1513, in accordance therewith, according to a voltage charged in the first storage capacitor Cst1, a sensing current may flow to the charging ratio sensing unit 600. The sensing current may be supplied to the inverting terminal– of the operational amplifier Amp. In accordance with supply of the sensing current to the charging ratio sensing unit 600, the voltage level of the voltage Vout of the output node No may decrease from the sensing reference voltage Vsen_ref over time.

The charged voltage sampling step S1514 may be a step in which the voltage Vout of the output node No is sampled.

The charged voltage sampling step S1514 may be a step in which a predetermined voltage tracked by the charging ratio sensing unit 600 is sampled.

In the charged voltage sampling step S1514, the sampling signal Sampling may be at the turn-on level. When the sampling signal Sampling is at the turn-on level, a sampling circuit (not illustrated) may sample the voltage Vout of the output node No.

The magnitude of a voltage sampled in a charged voltage sampling step S1514_1 included in the first subpixel charging ratio sensing step S1510_1 may be different from that of a voltage sampled in a charged voltage sampling step S15142 included in the second subpixel charging ratio sensing step S15102.

The capacitor voltage charging step S1511, the charging ratio sensing unit initializing step S1512, the charged voltage tracking step S1513, and the charged voltage sampling step S1514 may be included in a subpixel charging ratio sensing step S1510.

The subpixel charging ratio sensing step S1510 may be a step in which the charging ratio C_ratio of a subpixel SP electrically connected to a specific gate line GL is sensed.

The subpixel charging ratio sensing step S1510 may repeatedly performed as below. For example, after a first subpixel charging ratio sensing step S1510_1 in which the charging ratio C_ratio1 of a subpixel SP1 electrically connected to a first gate line GL1 is sensed advances, a second subpixel charging ratio sensing step S1510_2 in which the charging ratio C_ratio2 of a subpixel SP2 electrically connected to a second gate line GL2 is sensed may advance. In other words, the subpixel charging ratio sensing step S1510 may be repeatedly performed with reference to a gate line GL. As the gate line GL, a first gate line GL1 to an m-th gate line GLm may be sequentially selected, but the order is not limited thereto.

In other words, after the subpixel charging ratio sensing step S1510 for a first gate line GL1 advances, the subpixel charging ratio sensing step S1510 for a second gate line GL2 may advance. In a case in which the subpixel charging ratio sensing step S1510 is repeatedly performed, the subpixel charging ratio sensing step S1510 for a final gate line may advance. The subpixel charging ratio sensing step S1510 for the final gate line may be the subpixel charging ratio sensing step S1510 that is performed last.

In other words, after the charged voltage sampling step S1514 included in the subpixel charging ratio sensing step S1510, it is necessary to determine whether the subpixel charging ratio sensing step S1510 is the subpixel charging ratio sensing step S1510 for the final gate line GLm.

Thus, after the charged voltage sampling step S1514, a final gate line determining step S1520 may advance.

The final gate line determining step S1520 may be a step in which it is determined whether the gate line GL for which sensing has advanced is the final gate line. In other words, the final gate line determining step S1520 may be a step in which it is determined whether a gate line GL electrically connected to the subpixel SP is the final gate line.

The charging ratio LUT generating step S1530 may be a step in which a voltage gain ratio a corresponding to the charging ratio change value C_ratio' is calculated, and a lookup table (LUT) is generated.

The charging ratio LUT generating step S1530 may be a step in which a lookup table (LUT) is generated on the basis of a predetermined voltage that has been sampled.

After the charging ratio C_ratio of the storage capacitor Cst is derived, a charging ratio change value C_ratio' may be derived on the basis of this charging ratio C_ratio. Thereafter, by calculating a voltage gain ratio a corresponding to the charging ratio change value C_ratio,' a lookup table (LUT) may be generated.

The charging ratio LUT applying step S1540 may be a step in which the lookup table LUT is applied to a subpixel SP corresponding to this charging ratio change value C_ratio'.

The charging ratio LUT applying step S1540 may be a step in which a changed data voltage Vdata' that is a data voltage changed on the basis of the lookup table (LUT) is supplied to a data line DL that is electrically connected to the subpixel SP.

The charging ratio C_ratio of the storage capacitor Cst may be improved by applying the lookup table LUT to a subpixel SP corresponding to a corresponding charging ratio change value C_ratio.' In other words, in accordance with supply of the changed data voltage Vdata' acquired by applying the voltage gain ratio a to the data voltage Vdata to the subpixel SP, the charging ratio C_ratio of the storage capacitor Cst may be improved.

According to the aspects of the present disclosure described above, a display device and a driving method capable of efficiently improving a pixel charging ratio may be provided.

According to the aspects of the present disclosure, in accordance with efficient improvement of a pixel charging ratio, a display device and a driving method capable of low-power driving may be provided.

The aspects of the present disclosure described above may be briefly described as below.

According to the aspects of the present disclosure, there may be provided a display device including: a driving transistor used for driving a light emitting element; a scanning transistor electrically connected between a first node that is a gate node of the driving transistor and a data line to which a data voltage is supplied; a storage capacitor electrically connected between a second node of the driving transistor and the first node; and a charging ratio sensing unit electrically connected to the data line through an input line, in which the charging ratio sensing unit senses a voltage charged in the storage capacitor through the input line.

The charging ratio sensing unit may include: an operational amplifier including an inverting terminal electrically connected to the input line, a non-inverting terminal, and an output terminal; a sensing capacitor electrically connected between an inverting node to which the inverting terminal is electrically connected and an output node electrically connected to the output terminal; and an initialization switch electrically connected between the inverting node and the output node.

The charging ratio sensing unit may be driven in a subpixel charging ratio sensing period used for sensing a charging ratio of the storage capacitor.

The subpixel charging ratio sensing period may advance in a period different from a frame video period in which the light emitting element emits light, and a frame video is displayed.

The subpixel charging ratio sensing period may include: a charging period in which the storage capacitor is charged with a predetermined voltage; an initialization period in which the charging ratio sensing unit is initialized; a tracking period in which the predetermined voltage charged in the storage capacitor is tracked by the charging ratio sensing unit; and a sampling period in which the voltage tracked by the charging ratio sensing unit is sampled.

A first subpixel may include the driving transistor, the light emitting element, the storage capacitor, and the scanning transistor electrically connected to a first gate line, and the subpixel charging ratio sensing period may include: a first subpixel charging ratio sensing period in which the first subpixel electrically connected to the first gate line is sensed; and a second subpixel charging ratio sensing period in which a second subpixel electrically connected to a second gate line is sensed.

A first data voltage supplied to the data line in a charging period included in the first subpixel charging ratio sensing period may be the same as a second data voltage supplied to the data line in a charging period included in the second subpixel charging ratio sensing period.

A magnitude of a first data voltage supplied to the data line in a charging period included in the first subpixel charging ratio sensing period may be different from that of a second data voltage supplied to the data line in a charging period included in the second subpixel charging ratio sensing period.

A magnitude of a voltage sampled in a first sampling period included in the first subpixel charging ratio sensing period may be different from that of a voltage sampled in a second sampling period included in the second subpixel charging ratio sensing period.

The data voltage may be changed to a changed data voltage on the basis of the charging ratio of the storage capacitor sensed in the subpixel charging ratio sensing period, and the changed data voltage may be supplied to the data line.

The charging ratio sensing unit may include a first charging ratio sensing unit electrically connected to a first input line that is the input line and a second charging ratio sensing unit electrically connected to a second input line.

The charging ratio sensing unit is electrically connected to an input terminal of a MUX circuit, and a first input line that is the input line may be electrically connected to a first output terminal of the MUX circuit, and a second input line is electrically connected to a second output terminal of the MUX circuit.

The charging ratio sensing unit may be included in a display panel in which multiple subpixels are disposed or included in a data driving circuit supplying a voltage to the data line.

According to aspects of the present disclosure, there may be provided a driving method for a display device, the driving method including: a capacitor voltage charging step of charging a storage capacitor included in a subpixel with a predetermined voltage; a charging ratio sensing unit initializing step of initializing a charging ratio sensing unit electrically connected to the subpixel; a charged voltage tracking step of tracking the predetermined voltage charged in the storage capacitor using the charging ratio sensing unit; and a charged voltage sampling step of sampling the predetermined voltage tracked by the charging ratio sensing unit.

A final gate line determining step of determining whether a gate line electrically connected to the subpixel is a final gate line; a charging ratio lookup table generating step of generating a lookup table on the basis of the predetermined voltage that is sampled; and a charging ratio lookup table applying step of supplying a changed data voltage that is a data voltage changed on the basis of the lookup table to a data line electrically connected to the subpixel may be further included.

The capacitor voltage charging step, the charging ratio sensing unit initializing step, the charged voltage tracking step, and the charged voltage sampling step are included in a subpixel charging ratio sensing step, and the subpixel charging ratio sensing step may include a first subpixel charging ratio sensing step for a first subpixel that is the subpixel and a second subpixel charging ratio sensing step for a second subpixel.

A first data voltage supplied to a data line in a first capacitor voltage charging step included in the first subpixel charging ratio sensing step may be the same as a second data voltage supplied to the data line in a second capacitor voltage charging step included in the second subpixel charging ratio sensing step.

A magnitude of a first data voltage supplied to a data line in a first capacitor voltage charging step included in the first subpixel charging ratio sensing step may be different from that of a second data voltage supplied to the data line in a second capacitor voltage charging step included in the second subpixel charging ratio sensing step.

A magnitude of a voltage sampled in a charged voltage sampling step included in the first subpixel charging ratio sensing step may be different from that of a voltage sampled in a charged voltage sampling step included in the second subpixel charging ratio sensing step.

The charging ratio sensing unit may be configured using a circuit that is used for sensing a voltage charged in the storage capacitor.

The above description has been presented to enable any person skilled in the art to make and use the technical idea of the present disclosure, and has been provided in the context of a particular application and its requirements. Various modifications, additions and substitutions to the described aspects will be readily apparent to those skilled in the art, and the general principles defined herein may be applied to other aspects and applications without departing from the spirit and scope of the present disclosure. The above description and the accompanying drawings provide an example of the technical idea of the present disclosure for illustrative purposes only. That is, the disclosed aspects are intended to illustrate the scope of the technical idea of the present disclosure.

It will be apparent to those skilled in the art that various modifications and variations can be made in the display device and the driving method of the present disclosure without departing from the spirit or scope of the aspects of the present disclosure. Thus, it is intended that the present disclosure covers the modifications and variations of the aspects provided they come within the scope of the appended claims and their equivalents.

What is claimed is:

1. A display device comprising:

a driving transistor configured to drive a light emitting element and electrically connected to a reference voltage line;

a scanning transistor electrically connected between a first node that is a gate node of the driving transistor and a data line to which a data voltage is supplied;

a storage capacitor electrically connected between a second node of the driving transistor and the first node; and a charging ratio sensing unit electrically connected to an input line directly electrically connected to both the data line and a source or drain node of the scanning transistor and configured to sense a voltage charged in the storage capacitor through the input line, wherein the input line is electrically connected between the data line and the charging ratio sensing unit, and wherein the charging ratio sensing unit configured to sense a voltage charged in the storage capacitor through the input line and the data line.

2. The display device according to claim 1, wherein the charging ratio sensing unit includes:

an operational amplifier including an inverting terminal electrically connected to the input line, a non-inverting terminal, and an output terminal;

a sensing capacitor electrically connected between an inverting node to which the inverting terminal is electrically connected and an output node electrically connected to the output terminal; and an initialization switch electrically connected between the inverting node and the output node.

3. The display device according to claim 1, wherein the charging ratio sensing unit is driven in a subpixel charging ratio sensing period used for sensing a charging ratio of the storage capacitor.

4. The display device according to claim 3, wherein the subpixel charging ratio sensing period advances in a period different from a frame video period in which the light emitting element emits light, and a frame video is displayed.

5. A display device comprising:

a driving transistor configured to drive a light emitting element;

a scanning transistor electrically connected between a first node that is a gate node of the driving transistor and a data line to which a data voltage is supplied;

a storage capacitor electrically connected between a second node of the driving transistor and the first node; and a charging ratio sensing unit electrically connected to the data line through an input line and sensing a voltage charged in the storage capacitor through the input line, wherein the charging ratio sensing unit is driven in a subpixel charging ratio sensing period used for sensing a charging ratio of the storage capacitor, and wherein the subpixel charging ratio sensing period includes:

a charging period in which the storage capacitor is charged with a predetermined voltage;

an initialization period in which the charging ratio sensing unit is initialized;

a tracking period in which the predetermined voltage charged in the storage capacitor is tracked by the charging ratio sensing unit; and a sampling period in which the voltage tracked by the charging ratio sensing unit is sampled.

6. The display device according to claim 5, wherein a first subpixel includes the driving transistor, the light emitting element, the storage capacitor, and the scanning transistor electrically connected to a first gate line, and wherein the subpixel charging ratio sensing period includes:

a first subpixel charging ratio sensing period in which the first subpixel electrically connected to the first gate line is sensed; and a second subpixel charging ratio sensing period in which a second subpixel electrically connected to a second gate line is sensed.

7. The display device according to claim 6, wherein a first data voltage supplied to the data line in a charging period included in the first subpixel charging ratio sensing period is the same as a second data voltage supplied to the data line in a charging period included in the second subpixel charging ratio sensing period.

8. The display device according to claim 6, wherein a magnitude of a first data voltage supplied to the data line in a charging period included in the first subpixel charging ratio sensing period is different from that of a second data voltage supplied to the data line in a charging period included in the second subpixel charging ratio sensing period.

9. The display device according to claim 6, wherein a magnitude of a voltage sampled in a first sampling period included in the first subpixel charging ratio sensing period is different from that of a voltage sampled in a second sampling period included in the second subpixel charging ratio sensing period.

10. The display device according to claim 3, wherein the data voltage is changed to a changed data voltage on the basis of the charging ratio of the storage capacitor sensed in the subpixel charging ratio sensing period, and wherein the changed data voltage is supplied to the data line.

11. The display device according to claim 1, wherein the charging ratio sensing unit includes a first charging ratio sensing unit electrically connected to a first input line that is the input line and a second charging ratio sensing unit electrically connected to a second input line.

12. The display device according to claim 1, wherein the charging ratio sensing unit is electrically connected to an input terminal of a MUX circuit, and wherein a first input line that is the input line is electrically connected to a first output terminal of the MUX circuit, and a second input line is electrically connected to a second output terminal of the MUX circuit.

13. The display device according to claim 1, wherein the charging ratio sensing unit is included in a display panel in which multiple subpixels are disposed or is included in a data driving circuit supplying a voltage to the data line.

14. A driving method for a display device, the driving method comprising:

a capacitor voltage charging step of charging a storage capacitor included in a subpixel with a predetermined voltage;

a charging ratio sensing unit initializing step of initializing a charging ratio sensing unit electrically connected to the subpixel;

a charged voltage tracking step of tracking the predetermined voltage charged in the storage capacitor using the charging ratio sensing unit; and a charged voltage sampling step of sampling the predetermined voltage tracked by the charging ratio sensing unit, wherein the capacitor voltage charging step, the charging ratio sensing unit initializing step, the charged voltage tracking step, and the charged voltage sampling step are included in a subpixel charging ratio sensing step, and wherein the subpixel charging ratio sensing step includes a first subpixel charging ratio sensing step for a first subpixel that is the subpixel and a second subpixel charging ratio sensing step for a second subpixel.

15. The driving method according to claim 14, further comprising:

a final gate line determining step of determining whether a gate line electrically connected to the subpixel is a final gate line;

a charging ratio lookup table generating step of generating a lookup table on the basis of the predetermined voltage that is sampled; and a charging ratio lookup table applying step of supplying a changed data voltage that is a data voltage changed on the basis of the lookup table to a data line electrically connected to the subpixel.

16. The driving method according to claim 14, wherein a first data voltage supplied to a data line in a first capacitor voltage charging step included in the first subpixel charging ratio sensing step is the same as a second data voltage supplied to the data line in a second capacitor voltage charging step included in the second subpixel charging ratio sensing step.

17. The driving method according to claim 14, wherein a magnitude of a first data voltage supplied to a data line in a first capacitor voltage charging step included in the first subpixel charging ratio sensing step is different from that of a second data voltage supplied to the data line in a second capacitor voltage charging step included in the second subpixel charging ratio sensing step.

18. The driving method according to claim 14, wherein a magnitude of a voltage sampled in a charged voltage sampling step included in the first subpixel charging ratio sensing step is different from that of a voltage sampled in a charged voltage sampling step included in the second subpixel charging ratio sensing step.

19. The driving method according to claim 14, wherein the charging ratio sensing unit is configured using a circuit that is used for sensing a voltage charged in the storage capacitor.

* * * * *